(12) United States Patent
Pantic et al.

(10) Patent No.: US 10,784,725 B2
(45) Date of Patent: Sep. 22, 2020

(54) VEHICLE MISALIGNMENT MEASUREMENT AND COMPENSATION IN DYNAMIC WIRELESS CHARGING APPLICATIONS

(71) Applicants: Zeljko Pantic, North Logan, UT (US);
Ahmed Nasim Azad, Logan, UT (US);
Seyed Mohammad Reza Tavakoli, Logan, UT (US)

(72) Inventors: Zeljko Pantic, North Logan, UT (US);
Ahmed Nasim Azad, Logan, UT (US);
Seyed Mohammad Reza Tavakoli, Logan, UT (US)

(73) Assignee: Utah State University, Logan, UT (US)

( * ) Notice: Subject to any disclaimer, the term of this patent is extended or adjusted under 35 U.S.C. 154(b) by 24 days.

(21) Appl. No.: 16/144,613

(22) Filed: Sep. 27, 2018

(65) Prior Publication Data
US 2019/0097471 A1 Mar. 28, 2019

Related U.S. Application Data

(60) Provisional application No. 62/564,135, filed on Sep. 27, 2017.

(51) Int. Cl.
*H02J 7/00* (2006.01)
*H02J 50/90* (2016.01)
(Continued)

(52) U.S. Cl.
CPC ............. *H02J 50/90* (2016.02); *B60L 53/12* (2019.02); *B60L 53/39* (2019.02); *H02J 50/12* (2016.02); *H02J 50/40* (2016.02); *H02J 50/60* (2016.02)

(58) Field of Classification Search
CPC .. H03H 7/40; H02J 50/12; H02J 50/60; H02J 50/90; H02J 50/70; H02J 50/80;
(Continued)

(56) References Cited

U.S. PATENT DOCUMENTS

| | | | | |
|---|---|---|---|---|
| 2009/0096413 A1* | 4/2009 | Partovi | ................... | H01F 5/003 320/108 |
| 2010/0219694 A1* | 9/2010 | Kurs | ....................... | H02J 50/80 307/104 |
| 2014/0217966 A1* | 8/2014 | Schneider | ............... | H02J 7/025 320/108 |

OTHER PUBLICATIONS

Yang et al. "Design of a High Lateral Misalignment Tolerance Magnetic Coupler for Wireless Power Transfer Systems" 2017 IEEE pp. 34-39. (Year: 2017).*

(Continued)

*Primary Examiner* — Binh C Tat

(57) ABSTRACT

For misalignment measurement, a method receives a plurality of position detection signals from a corresponding plurality of detection coils. The plurality of position detection signals are generated from mutual inductance between the plurality of detection coils and an energized field-generating detection coil. The method further generates detection information from the position detection signals. In addition the method calculates a lateral misalignment along a lateral Y axis from the detection information. The lateral misalignment includes a lateral misalignment distance and a lateral misalignment direction. The method calculates a vehicle speed along a longitudinal X axis from the detection information. In addition, the method energizes a transmitter power coil and controls the power transfer based on the vehicle speed and lateral misalignment.

18 Claims, 28 Drawing Sheets

(51) Int. Cl.
  *H02J 50/12*    (2016.01)
  *B60L 53/39*    (2019.01)
  *B60L 53/12*    (2019.01)
  *H02J 50/40*    (2016.01)
  *H02J 50/60*    (2016.01)

(58) Field of Classification Search
  CPC .. H02J 50/50; H02J 7/025; H02J 5/005; H02J 7/0029; H02J 7/0047; H02J 50/05; H02J 50/40; H02J 7/35; H02J 50/10; H02J 2310/48; H02J 7/00; H02J 7/00045; H02J 2310/40; H02J 7/0027; H02J 2207/40; H02J 50/20; H02J 50/23; H02J 7/00034; B60L 53/305; B60L 2210/30; B60L 2210/40; B60L 53/39; B60L 2210/10; B60L 2240/72; B60L 53/53; Y02T 90/122; Y02T 90/14; Y02T 10/7072; Y02T 90/125; Y02T 90/127; Y02T 90/16
  USPC .................................................. 320/106–115
  See application file for complete search history.

(56) References Cited

OTHER PUBLICATIONS

Azad et al. Analysis, Optimization, and Demonstration of a Vehicular Detection System Intended for Dynamic Wireless Charging Applications. IEEE Transactions on Transportation Electrification. Mar. 2019. vol. 5. No 1.

Azad et al. Comprehensive Inductive System for Vehicle Misalignment Detection Intended for Dynamic Wireless Charging Applications. Select Annual Meeting and Technology Showcase. Sep. 27, 2016. Logan, UT.

* cited by examiner

US 10,784,725 B2

VEHICLE MISALIGNMENT MEASUREMENT AND COMPENSATION IN DYNAMIC WIRELESS CHARGING APPLICATIONS

CROSS-REFERENCE TO RELATED APPLICATIONS

This application claims priority to U.S. Provisional Patent Application No. 62/564,135 entitled "VEHICLE MISALIGNMENT MEASUREMENT AND COMPENSATION IN DYNAMIC WIRELESS CHARGING APPLICATIONS" and filed on Sep. 27, 2017 for Zeljko Pantic, which is incorporated herein by reference.

FIELD

The present disclosure relates to dynamic wireless charging, more particularly, to novel systems and methods for measuring and compensating for vehicle misalignment in dynamic wireless charging applications.

BACKGROUND

Description of the Related Art

Electrical energy may be transmitted wirelessly to a vehicle.

BRIEF SUMMARY

A method for vehicle misalignment measurement is disclosed. The method receives a plurality of position detection signals from a corresponding plurality of detection coils. The plurality of position detection signals are generated from mutual inductance between the plurality of detection coils and an energized field-generating detection coil. The method further generates detection information from the position detection signals. In addition the method calculates a lateral misalignment along a lateral Y axis from the detection information. The lateral misalignment includes a lateral misalignment distance and a lateral misalignment direction. The method calculates a vehicle speed along a longitudinal X axis from the detection information. In addition, the method energizes a transmitter power coil and controls the power transfer based on the vehicle lateral misalignment. An apparatus and system also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
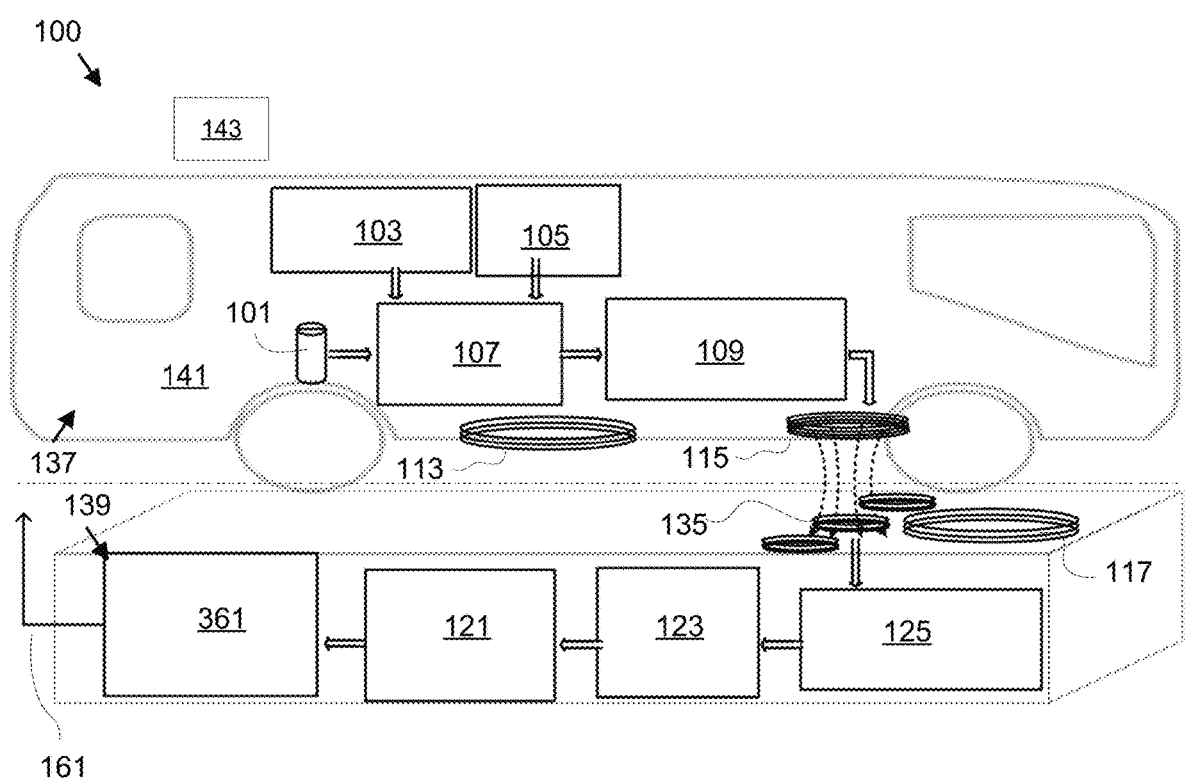
FIG. 1A is a schematic diagram illustrating one embodiment of a detection system.

Wireless Power Transfer (WPT) is sensitive to alignment between a primary or transmitter power coil, and a secondary, or receiver power coil. Misalignment causes increased magnetic leakage, resulting in lack of impedance matching and a significant drop in power transfer efficiency. In dynamic, or in-motion WPT, in order to avoid powering a transmitter power coil at an inappropriate time, it is necessary to detect an approaching receiver coil, or vehicle containing a receiver power coil, and activate a WPT system only when there is some substantial alignment between the transmitter and receiver coils.

Embodiments of the present disclosure solve the problems of detecting, measuring, and compensating for misalignment between a transmitter and receiver coil in dynamic WPT applications. The embodiments detect the presence of a receiver coil in a vehicle and any misalignment between the receiver power coil and the transmitter power coil for a wide range of misalignment values. The detection system is also capable of coping with variable vertical offsets caused by different vehicle ground clearances, which create varying offsets between a receiver and transmitter coil, by providing a general solution applicable to different vehicle models. Embodiments of the present disclosure further describe a novel detection hardware structure and associated algorithm based on inductively coupled coils and the induced voltage difference between detection coils in dynamic wireless charging applications. The disclosure further describes double and three-coil detection systems, together with their advantages and disadvantages. The embodiments have been successfully demonstrated for misalignment detection using double and three-coil systems. The inventor successfully implemented the detection and measurement system on a wirelessly charged 22-foot electric bus system in motion on an outdoor test track. The implementation involved the integration of the detection system in a fully functional dynamic charging environment. In embodiments, the generated detection signal was incorporated in the system that, depending on reported misalignment, adjusted the transmitted power accordingly so that the receiver power coil received a uniform amount of energy irrespective of its misalignment with respect to the transmitter coil. Embodiments may operate equally in different types of dynamic charging systems, irrespective of the type of power coils, their shape, layout, etc. Additionally, although embodiments of the present disclosure are implemented in dynamic WPT systems, the embodiments are equally applicable to stationary WPT applications or as part of a traffic detection system in general.

The embodiments includes apparatuses and associated methods for measuring and compensating for vehicle misalignment in dynamic wireless charging applications. In the following description, numerous specific details are provided for a thorough understanding of the embodiments. However, embodiments can be practiced without one or more of the specific details, or with other methods, components, materials, etc. In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional" or "optionally" or "or" refer, for example, to instances in which subsequently described circumstance may or may not occur, and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

Furthermore, the described features, advantages, and characteristics of the embodiments may be combined in any suitable manner. Embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. Aspects of the present invention may be embodied as a system, method, and/or computer program product. Accordingly, aspects of the present invention may take the form of an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements. The present disclosure covers systems and methods for measuring and compensating for vehicle misalignment in dynamic wireless charging applications.

Electric vehicles (EV) are gradually overcoming their limitations as an environment-friendly alternative to conventional gasoline vehicles. EV popularity is not only a result of environmental concerns but also caused by gasoline price fluctuations and worldwide fossil fuel depletion. By 2020, it is anticipated that at least one EV model from each major automobile company will be released. However, the EV industry still needs to address the "range anxiety" issue. Almost 70% of people in USA prefer not to buy an EV because of its limited range. Dynamic Wireless Power Transfer (DWPT) as a method of in-motion EV charging provides an opportunity to alleviate range anxiety by extending the EV all-electric range. In addition, it helps to reduce the battery size significantly, reducing the overall cost of an EV. High reliability, low maintenance, and above all, eco-friendliness makes this technology more suitable for EV applications. High-efficiency operation of over 90% is achievable by the use of inductive wireless charging, which makes Inductive Power Transfer (IPT) the most promising means of WPT charging.

In the past, vehicle detection methods has been focused on traffic management applications. Efficient traffic management calls for an Intelligent Transportation System (ITS) which, in real time, measures and maintains various traffic constraints. Vehicle detection is vitally important in this regard. Inductive loops, magnetic sensors, etc. are categorized as intrusive detection systems, whereas infrared or ultrasonic sensors are examples of non-intrusive systems. While comparing with other popular detection methods, inductive loops are better regarding cost, sensitivity, average lifespan etc. However, inductive loops require pavement-cutting, affecting the pavement's life. Magnetic sensors and some other advanced methods are also employed, each having its respective advantages and downsides.

Vehicle alignment detection systems have been implemented in stationary WPT applications show that only 5% of drivers perfectly align their vehicles with charging pads, which leads to insufficient and inefficient wireless charging. This makes a detection system necessary for stationary EV charging systems.

The embodiments provide a comprehensive Vehicular Detection System for DWPT applications (DWPT-VDS), operating on magnetic principles and immune to different vehicle-to-ground clearances. The following functionalities are integrated into the DWPT-VDS: i) a vehicle detection mechanism, ii) measurement of the vehicle lateral misalignment, iii) vehicle speed measurement, iv) Driver Information System (DIS), as well as v) wireless communication between a roadside power controller and the DIS. The embodiments include different coil structures and algorithms for speed and misalignment estimation in a DWPT-VDS. In one embodiment, the reported misalignment information is incorporated within the main DWPT controller which adjusts the transmitted power accordingly so that the vehicle receives a uniform average power irrespective of its misalignment. Furthermore, a DIS visualizing speed and misalignment information is also developed and tested to help the driver align the vehicle with the road-embedded road pads. The embodiments have been successfully implemented on a wirelessly charged electric bus and tested on an outdoor test track in a fully functional dynamic charging environment. The additional feature of speed detection could be used by the WPT controller to make time-critical activation decisions. The proposed method can operate equally in different types of dynamic charging systems, irrespective of the power coils' shape, layout, etc. Although the proposed method is implemented for DWPT systems, it is equally applicable to road WPT applications or as part of a traffic detection system in general.

FIG. 1A illustrates one embodiment of a DWPT system 100. The DWPT system 100 includes two subsystems, a vehicle circuit 137 mounted on a moving vehicle 141, and a road circuit 139 embodied in multiple decentralized road pads and Road Side Controllers (RSCs)) embedded in the road. The road pads may include transmission power coils 117. The road pads may include additional sensors. The vehicle detection coil 115 is mounted underneath the front part of the vehicle 141, such as an electric bus, while the road detection coil 135 may be positioned in front of, at, or even behind the transmitter power coil 117. The DWPT system further includes a battery 101, a driver/Energy Management System (EMS) input 103, a foreign object detection subsystem input 105, an inverter 107, a compensator 109, a communication line 161, a receiver power coil 113, a vehicle detection coil 115, a transmitter power coil 117, a microcontroller unit 361, an envelope detector 121, a rectifier 123, and a detection circuit compensator 125.

The nominal operating power of the DWPT system 100 may be set close to the maximum power the DWPT system 100 can manage in order to reduce the Volt/Ampere (VA) rating of road circuit 139 and vehicle circuit 137 and consequently, reduce the size and cost. When misalignment between units occurs, the misalignment causes reduction of transferred power in unregulated receiver power coils 113 and transmitter power coils 117. Knowledge about the lateral or longitudinal position of the vehicle 141 may help a driver to align the vehicle 141 and bring it to the best-operating conditions. In addition, determining the position can help the controlling procedures mentioned above to select the best control parameters. For example, the transmitter power coil 117 current can be controlled based on a predefined relationship with misalignment to maintain the same or similar magnetic field for the receiver power coil 113 irrespective of vehicle position. Misalignment as a parameter is closely related to the mutual inductance of the coils 113/117. However, the mutual inductance of the coils 113/117 is not identical since the same misalignment can cause different mutual couplings between coils 113/117 depending on the vertical offset that can vary, too.

DWPT is very sensitive to alignment between the coils 113/117 engaged in the energy exchange. The misalignment between coils 113/117 can occur in the lateral direction and longitudinal direction (direction of motion). Increase in misalignment leads to increased magnetic field leakage which reduces mutual inductance M and magnetic coupling k between pads. As Equation 1 suggests, the drop of power transfer happens very fast, proportional to $M^2$ as shown in Equation 1:

$$P_{out} = \omega_S \frac{M^2}{L_2} I_P^2 Q_L \qquad \text{Equation 1}$$

where $I_P$ is the primary coil current of the transmitter power coil 117, M is the mutual inductance between transmitter power coil 117 and the receiver power coil 113, $\omega_s$ is operation frequency, $L_2$ is receiver power coil inductance, and $Q_L$ is a receiver power coil loaded quality factor.

LaTeral Misalignment (LTM)

Vehicle LTM depends on the driver's driving habits, as well as road conditions. A standard deviation of misalignment of $s_D$=46 centimeters (cm) may be measured for an average driver. For a 46 cm misalignment, the expected received WPT energy of an "average" vehicle would drop 46% compared to the energy of a perfectly aligned one. On the other hand, intelligent dynamic charging systems with oversized subsystems and components would always have an option to compensate the reduced coupling and transfer some power, but at the price of reduced efficiency. Power can be boosted by increasing primary coil current $I_P$ or the loaded quality factor $Q_L$. $I_P$ can be controlled by the variable phase-shift angle of the primary inverter controller, while varying the duty ratio of a dc-dc converter at the secondary can be used as a method to control $Q_L$.

Additionally, misalignment can cause detuning of some simple transmitter power coil and receiver power coil impedance matching networks and consequently an efficiency drop when transferring the same power compared with an aligned case. To cope with this problem, complex tuning networks integrated into the compensation networks are sometimes used.

Alternatively, the loaded quality factor $Q_L$, can be varied using a power converter at the secondary so that the nominal power is maintained even when the vehicle 141 is misaligned. This method has the obvious advantage that it does not require a system for LTM measurement. However, it retains some serious drawbacks. $Q_L$, is recommended to stay in the range from 3-7 to avoid multiple problems at the secondary. To cope with misalignment, $Q_L$ may need to vary in a wide range. Main disadvantages of high $Q_L$, are: a) high reactive current flowing through secondary compensation network elements causing elevated secondary loss; b) VA rating of secondary compensation network elements being proportional to $Q_L$; and c) a detrimental detuning effect that secondary can cause to primary if the secondary reactance is not compensated, as being now scaled up $Q_L$ times. Therefore, $Q_L$ variation is typically applied for a narrow range, fine control of the transferred power, rather than for misalignment effect correction.

The embodiments eliminate misalignment by corrective action by the EV driver who would align the vehicle 141 to track the central line of the road pad while driving. To perform this action, the driver should know the amount and direction of misalignment in real time. The actual misalignment information should be as timely as possible. The lateral vehicle acceleration may depend on road type and conditions and vehicle type, and it is measured to vary in a broad range from 0.68 to 1.63 m/s² for most of the vehicles. If a lateral acceleration is adopted to be $a_L$=1 m/s², the LTM equal the standard deviation $s_D$=46 cm would be eliminated as shown in Equation 2.

$$t = \sqrt{\frac{2 \cdot LTM}{a_L}} \approx 0.96 \text{ s} \qquad \text{Equation 2}$$

A timely update of LTM information to the driver is necessary to allow correct decision-making. If it is required that information about LTM should be updated at least ten times during that period, the response of a DWPT-VDS in updating a DIS should be shorter than 96 ms.

In the case that misalignment cannot be corrected by the driver action, the current of the transmitter power coil 117 may be controlled so that zone of nominal energy transferred to the vehicle 141 is extended to laterally misaligned vehicles 141, still allowing efficient operation of the vehicle circuit 137. The successful operation of the algorithm is dependent upon accurate detection of LTM. If LTM is known, it is possible to adjust the reference of the primary track current so that transferred power is maintained as shown in Equation 3:

$$I_P^* = I_{P,nom} \frac{M_{max}}{M(LTM)} \qquad \text{Equation 3}$$

where $I_{P,nom}$ is the nominal value of the transmitter power coil current, and $M_{max}$ is the maximum possible mutual inductance between the transmitter power coil 117 and the receiver power coil 113. This approach does not interfere with the tuning of any side and offers a good efficiency. One downside is that controlling the transmitter power coil current requires the mutual coupling (mutual inductance) profile between the transmitter power coil 117 and the receiver power coil 113 to be known, which limits the applicability of the algorithm to well-tested and standardized systems.

LonGitudinal Misalignment (LGM)

LGM occurs when a DWPT charged EV transitions from one road pad to another, as well as before an EV 141 even enters the energized section of a road pad. Some attempts have been made to design and outline the road pads in the way to provide a seamless (sag-less) power transfer during the transition. However, it is more common to have periods of very low or no coupling between adjacent road pads. To preserve good energy efficiency, transmitter power coil 117 should be de-energized during the low coupling intervals, and a selected transmitter power coil 117 should be energized only when the coupling reaches a predetermined threshold value. In that case, the roadside controller should be capable of detecting the vehicle 141 before the receiver power coil 113 is directly on top of the transmitter power coil 117, and then energizing the transmitter power coil 117 promptly. If the WPT controller 147 acquires information about the vehicle speed and if the WPT controller 147 can track the power delivery to the receiver power coil 113, the embodiments estimate the moment when the next road pad will be reached and when the transmitter power coil 117 in the road pad should be energized.

In one embodiment, a detection system should not only work as a vehicle detection sensor, but also have some built-in intelligence to detect the misalignment of the vehicle's receiver power coil 113 with respect to the road pad and transmitter power coil 117. The analysis above helps identifying a minimum set of parameters a DWPT system 100 should provide for successful operation in a DWPT system 100 for: i) vehicle 141 presence at given place, 2) vehicle lateral misalignment, and 3) vehicle speed. The WPT controller 147 can use this misalignment and speed information to adjust the transmitted power accordingly. That way, the vehicle 141 would receive the same average power regardless of its misalignment, as long as the misalignment is within an acceptable range.

The DWPT system 100 may sense the vehicle 141, perform all calculations, and send the sensing and misalignment information to the WPT controller 147 before the receiver power coil 113 reaches the top of the road pad. The higher the speed of the vehicle 141, the less time is available for the DWPT system 100 operation. A high-speed and reliable communication network between a Road Side Controller (RSC) and the DWPT system 100 may be provided. WiFi, Dedicated Short-Range Communications (DSRC), or Radio Frequency Identification (RFID) communication have been used for stationary WPT applications. However, using a WiFi network, at 100 mph vehicle speed, only a 1 millisecond (ms) of additional latency may cause a 27 millimeter (mm) error in the vehicle position detection. Also, signal attenuation while propagating through 75 mm concrete to reach the road-embedded hardware may reduce the reliability. As a result, DSRC may be employed as described hereafter. In addition to low latency, DSRC network provides numerous other benefits such as interoperability, high reliability, security, and privacy.

In embodiments, the active part of the DWPT system 100, or the source of the high-frequency signal, is located with the vehicle 141 such that the vehicle 141 can control its own discoverability and prevent transmitter coil activation. Embodiments of the present disclosure include the EMS 103 on the vehicle 141. When the maximum State of Charge (SoC) of the vehicle's battery is reached, the EMS 103 turns off the receiver power coil 113 of the vehicle circuit 137 to make the vehicle 141 "magnetically invisible" and prevents further charging.

Figure 1B:
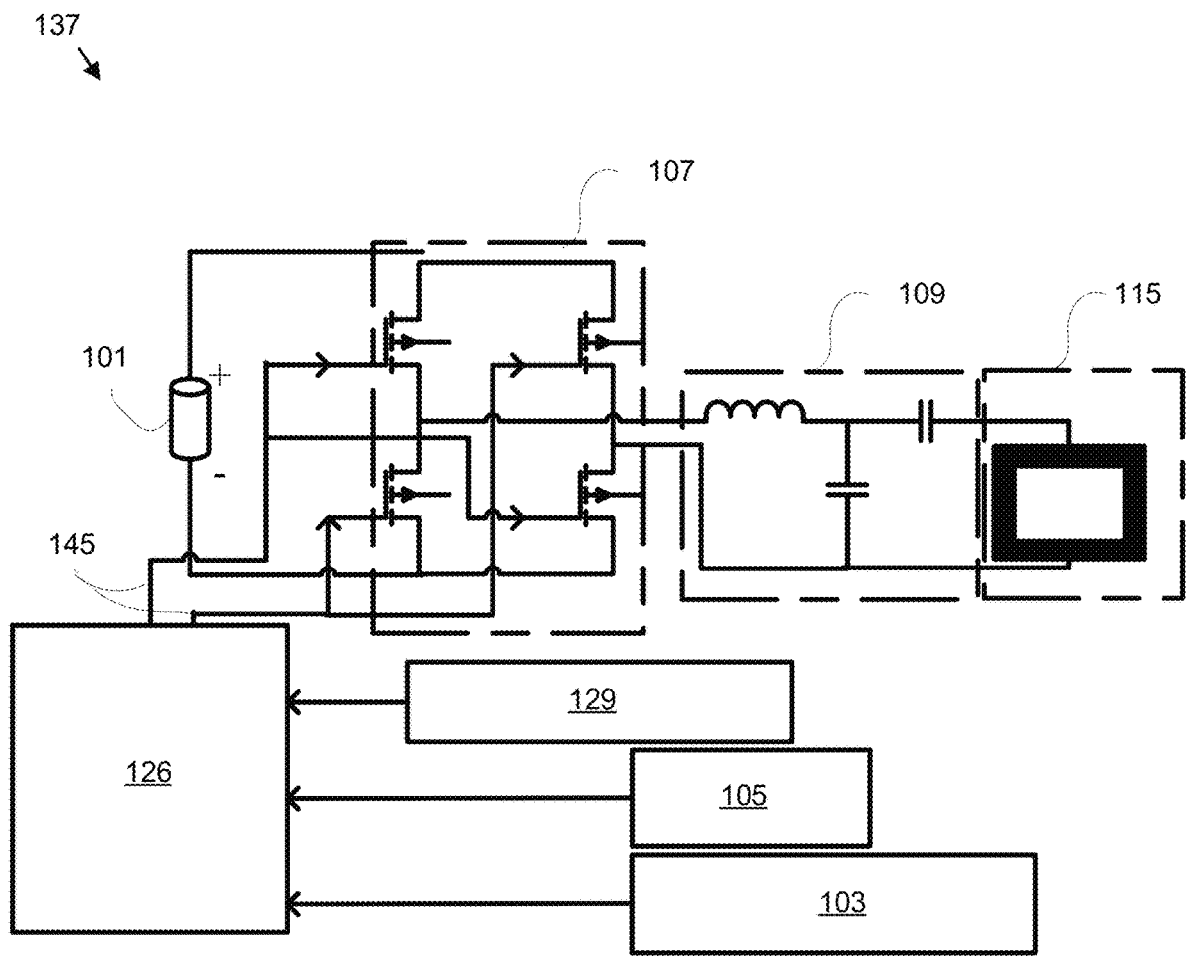
FIG. 1B is a schematic diagram illustrating one embodiment of a vehicle circuit.

FIG. 1B illustrates one embodiment of the vehicle circuit 137. The vehicle circuit 137 may include the inverter 107, the compensator 109, and the vehicle detection coil 115. In embodiments, the road circuit 137 takes power for operation directly from the vehicle 12-V battery 101, eliminating the need for an external power source. In embodiments, the full-bridge inverter 107 operates at fixed 50% duty cycle and outputs the maximum voltage at a switching frequency of 95 kHz.

The activation of the road circuit 139 may be established through a driver input or through the EMS 103. In addition, the driver can provide the same input with the help of a handheld remote device. Each of these inputs can switch off the vehicle circuit 137, if needed. This action would make the vehicle 141 "magnetically invisible" and prevent charging. For example, if the battery 101 is full, the EMS 103 might decide to deactivate the vehicle circuit 137 and prevent any further charging. Similarly, if the driver perceives some hazardous situation on the road, he/she might want to deactivate the vehicle circuit 137 with the remote control switch and prevent DWPT charging.

In embodiments, an inverter gate driver 126 generates four gate pulses 145 for the full-bridge inverter 107 and is controlled by a Pulse Width Modulation (PWM) generator 129, which is activated or terminated based on the Foreign Object Detection (FOD) circuit input 105, EMS input 103, and the driver input. A compensator 109 follows the inverter 107.

The topology of the compensator 109 affects the efficient operation of the system 100. Different types of series and parallel compensation have been proposed. In embodiments, the inductor/capacitor (LCC) compensation circuit has been employed. This topology makes the resonant frequency almost independent of the load and mostly unaffected by the coils' coupling coefficient. This topology results in improved lateral misalignment tolerance, which makes the detection range wider and improves the overall WPT efficiency. Zero voltage or current switching is also possible with the LCC structure. The vehicle detection coil 115 is connected in series with the compensator 109.

Figure 1C:
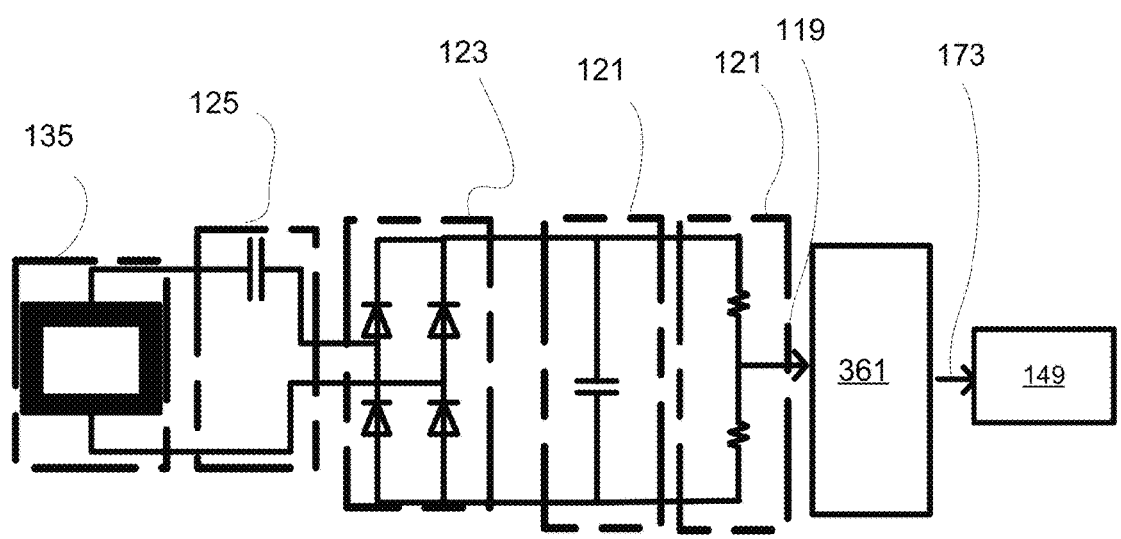
FIG. 1C is a schematic diagram illustrating one embodiment of a road circuit.

FIG. 1C illustrates a road circuit 139. In embodiments, it includes the road detection coil(s) 135, followed by a series capacitive compensation circuit 125 and a full-bridge rectifier 123, which converts the high-frequency induced waveform into a DC waveform. The road detection coils 135, and the vehicle detection coils 115, may be any sensor that detects a magnetic field. Appropriate values of capacitors in the envelope detector 121 may be placed at each rectifier output to properly capture the waveform envelope and reject the harmonics and noise without introducing much delay. These envelops contain the position detection signals 110, which is then processed by the microcontroller unit 361 to generate the detection information 173. In one embodiment, the WPT controller 147 comprises distributed controllers. The detection information 173 may be sent to the roadside controller 149, which controls the power level used energize the transmitter power coil 117 to charge the battery 101.

Figure 2A:
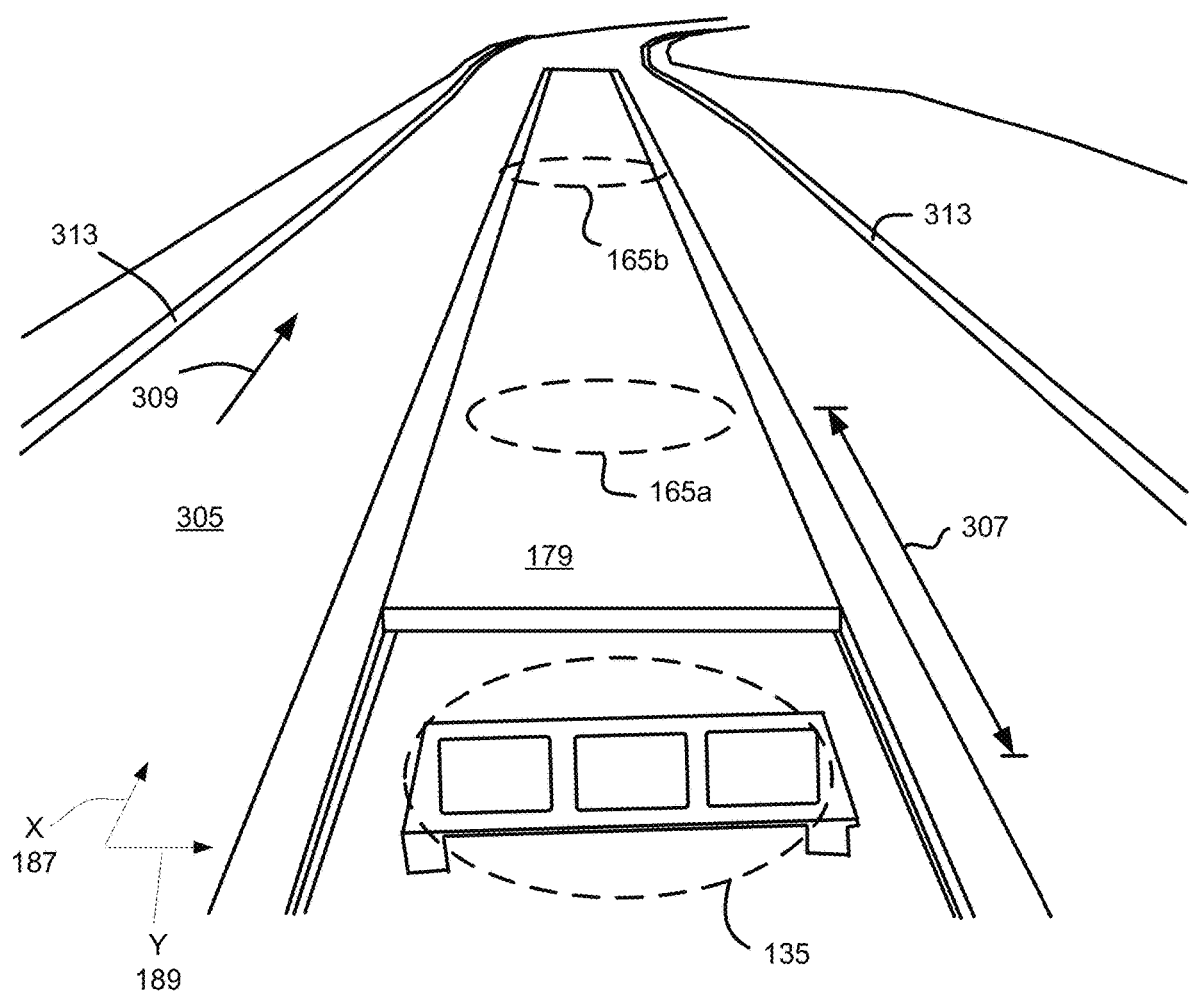
FIG. 2A is a drawing illustrating one embodiment of a road with road pad.

FIG. 2A illustrates one embodiment of a road 305 with multiple road pads 165 each comprising one or more transmission power coils 117 below a grate 179. The road 305 with side lines 313 is shown along with the driving direction 309. In the depicted embodiment, the road pads 165 are disposed in the center of the road 305. The road detection coils 135 are separated a first distance 307 from a first transmitter power coil 117*a* of a first road pad 165*a*. The first distance 307 may be in the range of 1 to 2 meters (m). In one embodiment, the first distance 307 is 1.473 m. In other embodiments, the road detection coils 135 may be at the same location as the transmitter power coil 117 because a vehicle detection coil 115 on the vehicle 141 may be on the front of the vehicle 141, or in front of the receiver power coil 113.

The road circuitry 139 may be embedded in the road 305. For proper operation, the vehicle detection coil 115 should move over the road detection coil 135 first and then over the transmitter power coils 117 of the road pad 165. In order to process the misalignment information 173 and energize the transmitter power coil 117 before the receiver power coil 113 is above transmitter power coil 117, the time taken for the receiver power coil 113 to move to the transmitter power coil 117 after crossing the road detection coils 135 should be greater than latency and processing time of the detection determined.

Figure 2B:
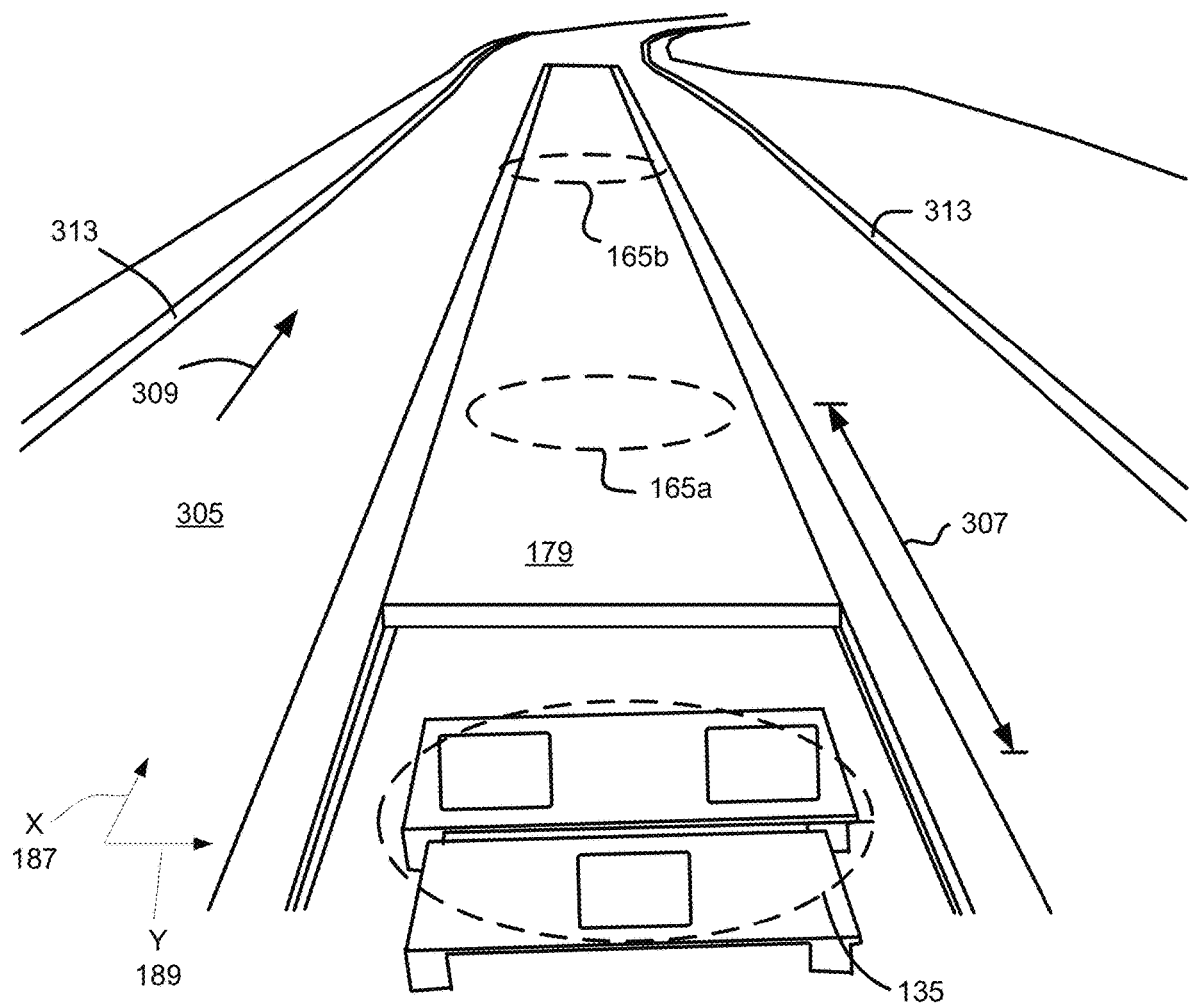
FIG. 2B is a drawing illustrating one alternate embodiment of a road with road pad.

FIG. 2B illustrates one embodiment of the road 305 of FIG. 2A, with an alternate arrangement of road detection coils 135.

Figure 3A:
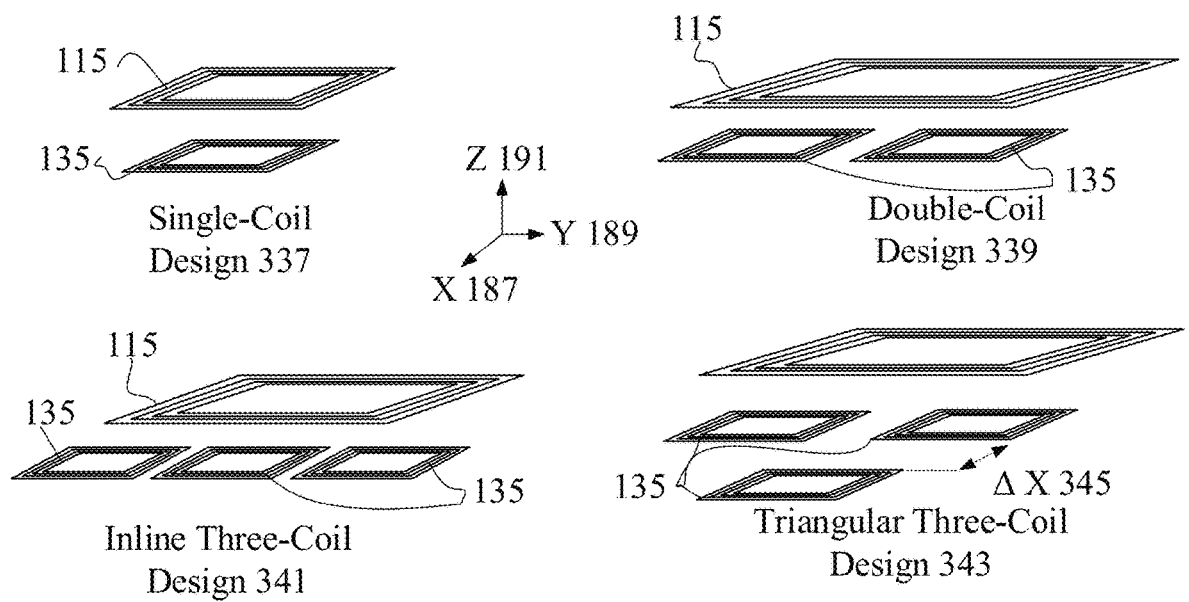
FIG. 3A is a perspective drawing illustrating embodiments of detection coil layouts.

FIG. 3A shows embodiments of four different layouts of the road detection coils 135 in a longitudinal X axis 187 and a lateral Y axis 189 relative to a vehicle detection coil 115 offset from the road detection coils 135 along a vertical Z axis 191. In embodiments, rectangular coil shapes are selected over circular or oval coil shapes to better fit the available space underneath the vehicle 141 and in the road 305. The embodiments include a single-coil design 337, a double-coil design 339, an inline three-coil design 341, and a triangular three-coil design 343. Three road detection coils 135 may be positioned in-line 341 or to form a triangle 343. The triangular three-coil design 343 has the advantage of measuring the vehicle speed at the cost of more space occupied in the road.

The envelops of the position detection signals 119 induced in the road detection coils 135 are used as an input to the detection algorithm. Detection coils 115/135 may be road detection coils 135 or vehicle detection coils 115. Regardless of the selected design or layout, the detected coil voltage envelope for every detection coil 115/135 is a bell-shaped curve along the longitudinal X axis 187 with a maxima reached where the detection coils 115/135 are aligned longitudinally. The bell-shaped curves provide for a lateral misalignment decision based on the maxima of each signal envelope reached at the longitudinally aligned point.

Figure 3B:
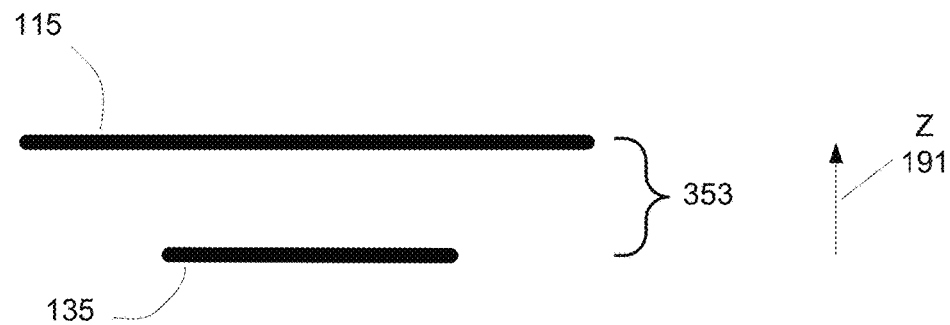
FIG. 3B is a side view drawing illustrating one embodiment of a vehicle detection coil and a road detection coil.

FIG. 3B is a side view drawing illustrating one embodiment of a vehicle detection coil 115 and a road detection coil 135. The vehicle detection coil 115 is separated from the road detection coil 135 along the vertical Z axis 191 by a vertical distance 353.

Figure 3C:
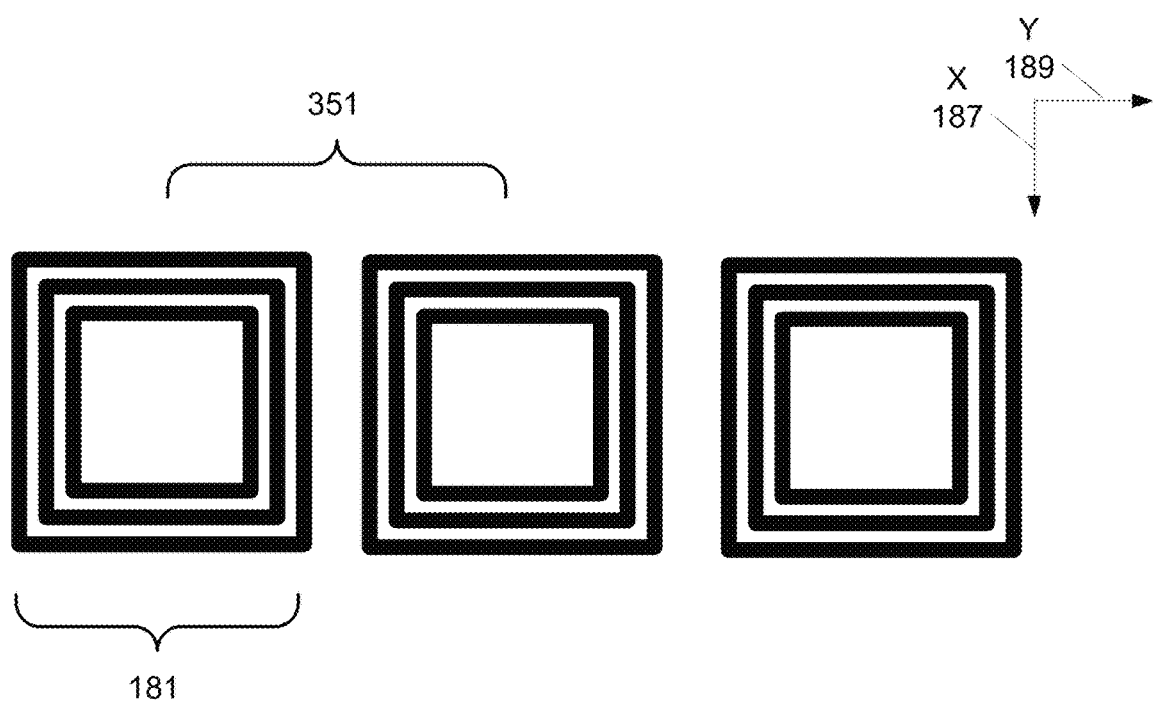
FIG. 3C is a top view drawing illustrating one embodiment of road detection coils.

FIG. 3C is a top view drawing illustrating one embodiment of detection coils 115/135 showing a center-to-center distance 351 and a detection coil width 181.

Figure 3D:
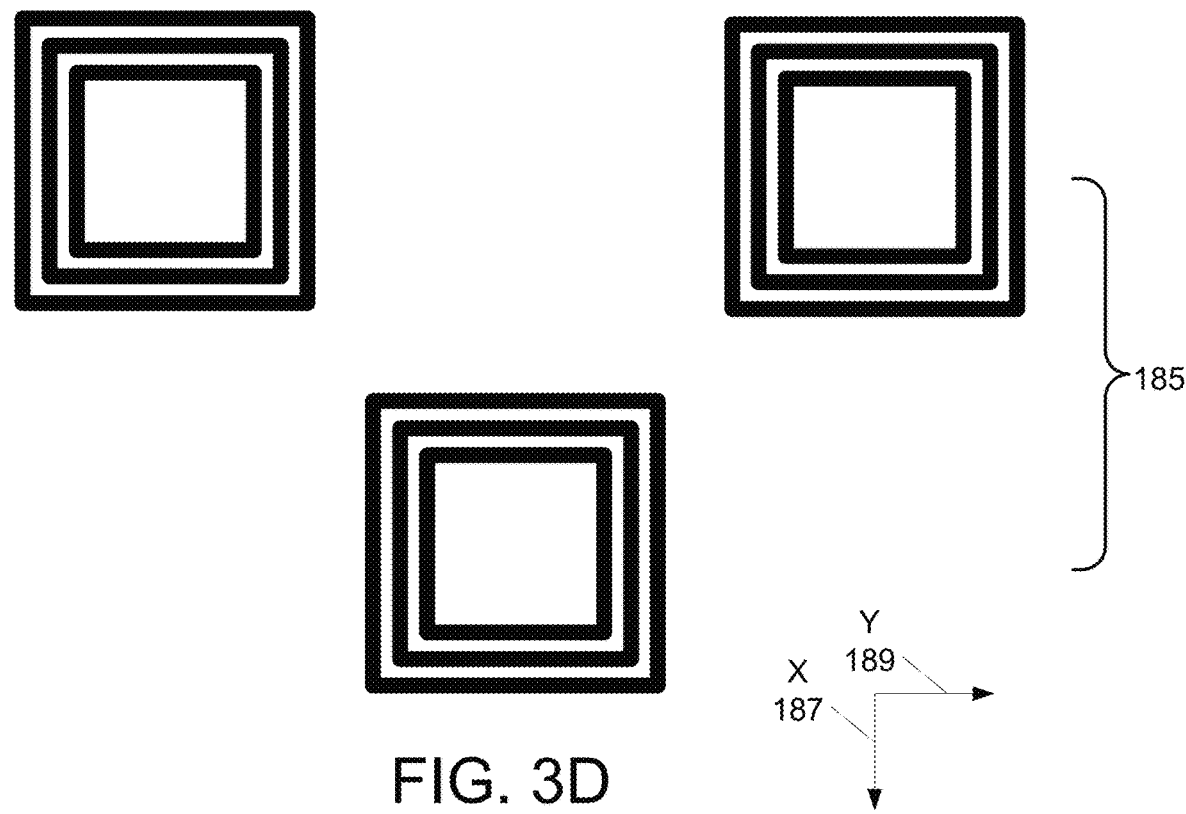
FIG. 3D is a top view drawing illustrating one alternate embodiment of road detection coils.

FIG. 3D is a top view drawing illustrating one alternate embodiment of road detection coils 135 showing a longitudinal distance 185.

Figure 4A:
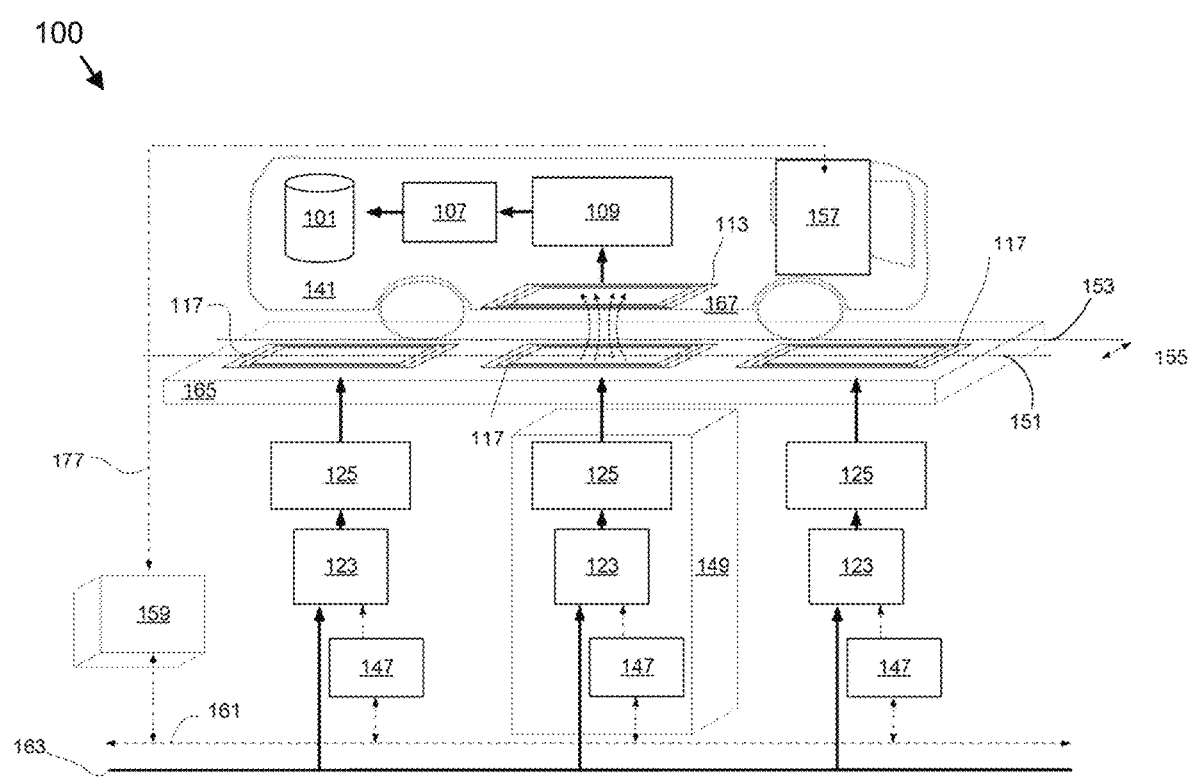
FIG. 4A is a schematic diagram illustrating one alternate embodiment of a Wireless Power Transfer dynamic system made of multiple road-embedded units.

FIG. 4A shows one embodiment of the DWPT system 100 of FIG. 1A. A road center axis 151 is shown for the road pad 165. In addition, a vehicle center axis 153 is shown for the vehicle 141. The lateral distance between the road center axis 151 and the vehicle center axis 153 is the LTM 155. The LTM 155 may comprise an LTM distance and an LTM direction. A power line 163 supplies power to a plurality of rectifiers 123. In addition, a communication line 161 is in communication with the plurality of WPT controllers 147 and a roadside communications module 159. The roadside communication module 159 may communicate via radio frequency (RF) communications 177 with a vehicle communications module 157. A roadside controller 149 may coordinate the WPT controllers 147.

Figure 4B:
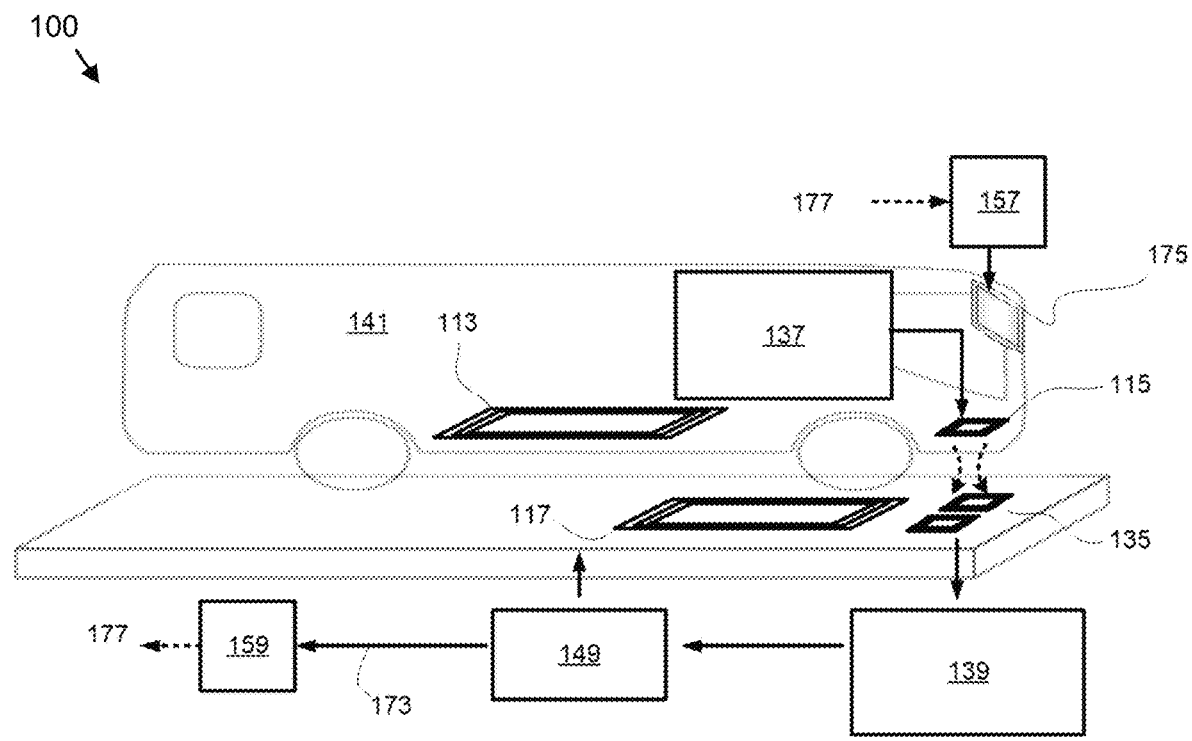
FIG. 4B is a schematic diagram illustrating one embodiment of a road side detection system.

FIG. 4B illustrates a road side embodiment of the DWPT system 100 of FIG. 4A. An energized field-generating detection coil 115 is mounted on the vehicle 141 and a plurality of detection coils 135 are embedded in the road 305. A magnetic field generated by the energized vehicle detection coil 115 of the approaching vehicle 141 is sensed by the plurality of road-embedded road detection coils 135 and road circuit 139, and processed by the roadside controller 149 to calculate LTM 155 and vehicle speed as described hereafter. This LTM 155 and vehicle speed is immediately used to calculate the activation time instance of the next transmitter power coil 117 and the current reference for the next transmitter power coil 117 so that the nominal power is transferred despite the misalignment. At the same time, RF communications 177 may be used to transfer collected information to a DIS 175. The driver, thereby, is offered an alternative to align the vehicle 141 and improve the DWPT performance.

The advantages of the depicted DWPT system 100 are multiple. Firstly, the vehicle 141 and/or driver has full control over the transmitter power coil activation. The vehicle 141 and/or driver can activate the vehicle detection coil 115, and make the vehicle 141 visible and susceptible to charging. Alternatively, the vehicle 141 and/or driver can decide to deactivate the vehicle detection coil 115 and travel through the electrified roadway section without receiving any power. Additionally, the vehicle speed, the LTM 155, and detection information 173 are collected by the roadside controller 149 providing time-critical information through a more reliable communication line 161. Later, the vehicle speed, the LTM 155, and detection information 173 are delivered to the vehicle 141 wirelessly via the RF communications 177, and as long as that action satisfies the latency criteria mentioned above, the driver will be timely informed about the driving conditions.

Figure 4C:
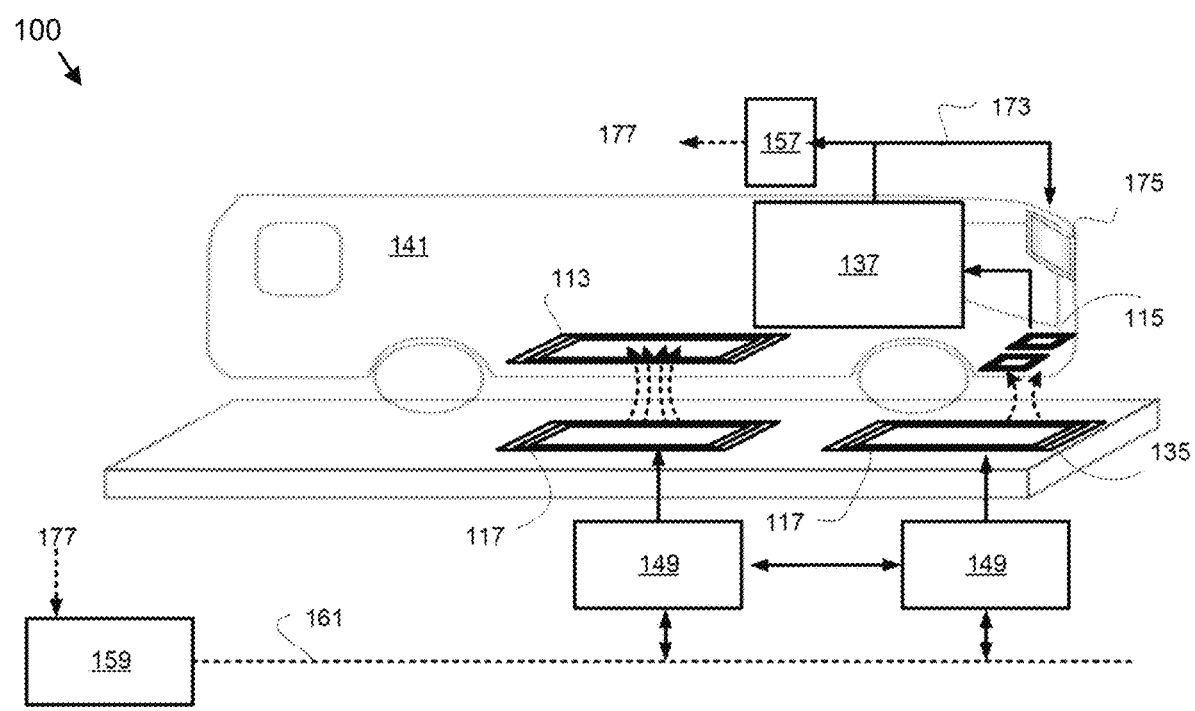
FIG. 4C is a schematic diagram illustrating one embodiment of a vehicle side detection system.

FIG. 4C illustrates a vehicle side detection embodiment of the DWPT system 100 of FIG. 4A. In this configuration, the transmitter power coil 117 could be used instead of additional road detection coils 135 as the energized field-generating detection coil 135. This transmitter power coil 117 would generate the field, which will be then sensed by the vehicle detection coil 115. Consequently, the vehicle circuit 137 would have the role of controlling the DWPT-VSDS. A wired underground communication line 161 allows the roadside controller 149 to determine the moment when to energize the transmission power coil 117 for detection purposes. It is expected that the DWPT system 100 will use different controlling strategy and different frequency when operating in vehicle side detection mode. The processed LTM 155 and vehicle speed are delivered to DIS through wired communication and directly displayed on it, whereas the same information is relayed to the roadside controller 149 via a high-speed RF link. The data are then utilized by the roadside controller 149 to calculate the transmission power coil activation timing and current reference for the one or more transmission power coils 117.

One advantage of the embodiment of FIG. 4C is that the embodiment is deployable in existing coil infrastructures without installing of any additional hardware periodically along the road 305, which entails less system complexity and lower cost. Secondly, since every transmitter power coil 117 can be used as transmitter, the update of the LTM and speed information is more frequent than in the embodiment of FIG. 4B. Finally, the reliability of DIS 175 is increased due to the wired connection between DIS 175 and the vehicle communications module 157. However, the latency and reliability issue of RF communications 177 could hamper the proper operation of roadside controllers 149 particularly at high vehicle speeds.

Figure 4D:
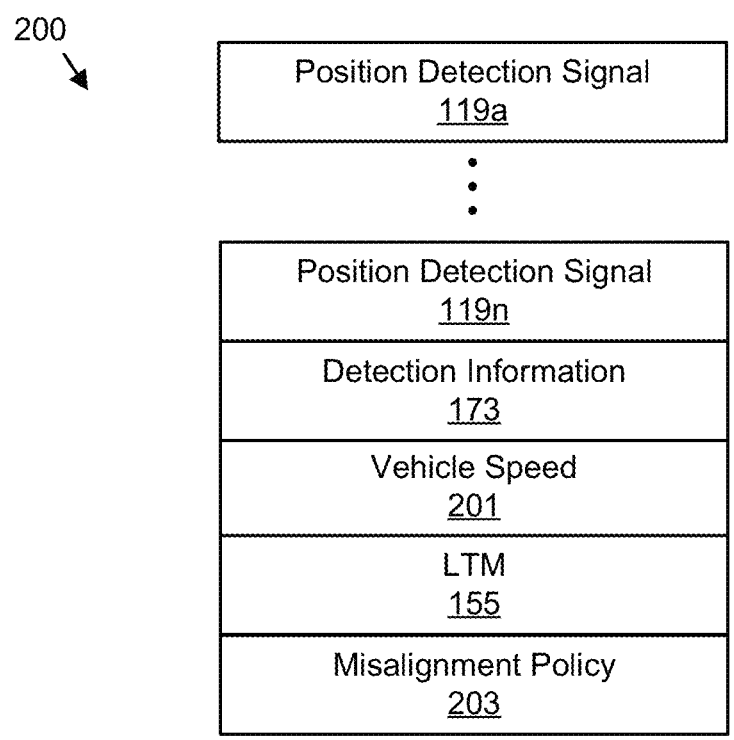
FIG. 4D is a schematic block diagram illustrating one embodiment of system data.

FIG. 4D is a schematic block diagram illustrating one embodiment of system data 200. The system data 200 may be organized as a data structure in a memory. In the depicted embodiment, the system data 200 includes one or more position detection signals, detection information 173, the vehicle speed 201, the LTM 155, and the misalignment policy 203.

The position detection signals 119 may be received from each detection coil 115/135. Each position detection signal 119 may include an analog signal. In addition, each position detection signal 119 may include a digitized digital value for a plurality of time instances.

The detection information 173 may be generated from the position detection signals 119. The detection information 173 may include voltage, signal envelopes, and/or temporal differences between the position detection signals 119 as will be described hereafter.

The vehicle speed 201 may be calculated from the detection information 173. The vehicle speed 201 may be the velocity of the vehicle 141 along the longitudinal X axis 187.

The LTM 155 may be calculated from the detection information 173. The LTM 155 may include an LTM distance along the lateral Y axis 189. In addition the LTM 155 may include an LTM direction along the lateral Y axis 189.

The misalignment policy 203 may determine whether to increase the current of the transmitter power coil 117. The misalignment policy 203 may not be satisfied if the LTM distance exceeds the misalignment distance (the allowed misalignment compensation range). In one embodiment, the misalignment distances are in the range of 7 to 60 cm along the lateral Y axis 189.

Figure 4E:
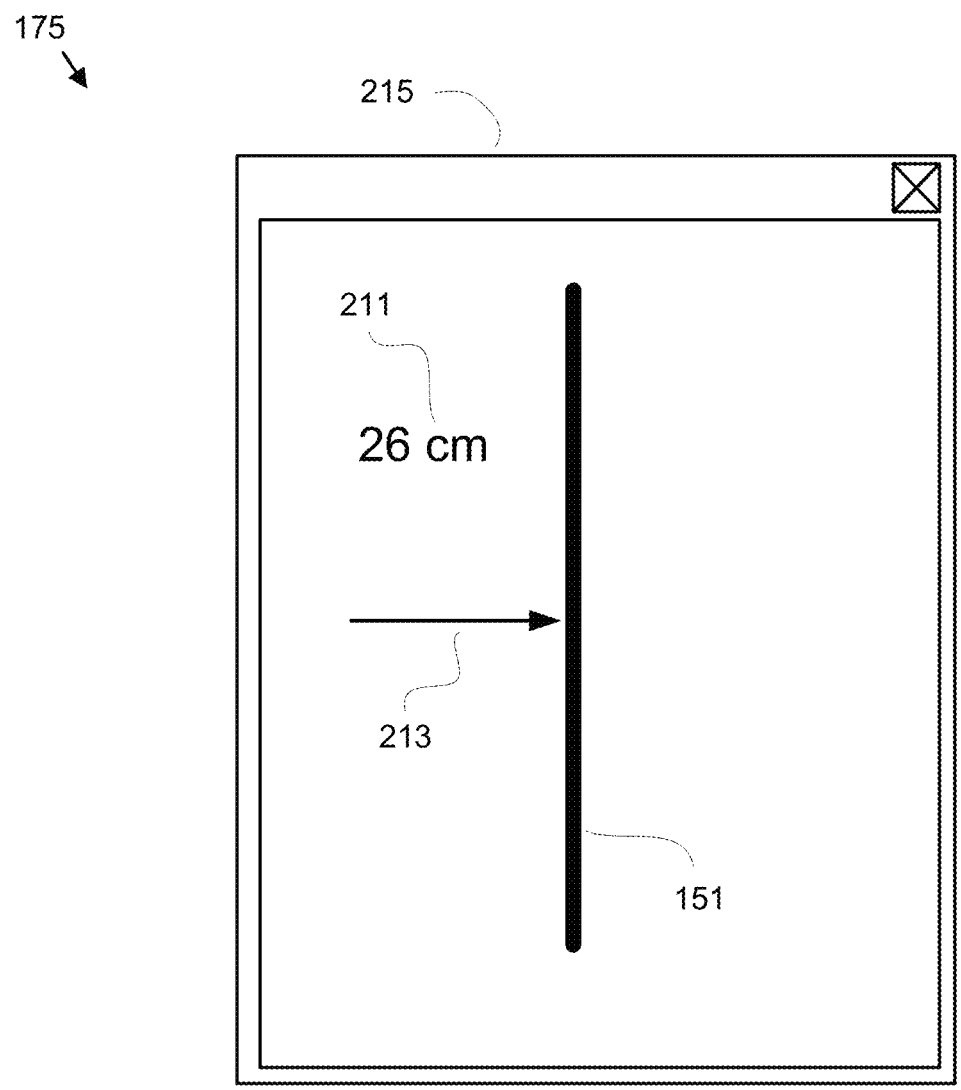
FIG. 4E is a front view drawing illustrating one embodiment of a driver information system.

FIG. 4E is a front view drawing illustrating one embodiment of a DIS 175. In the depicted embodiment, a display 215 presents the LTM distance 211 and the LTM direction 213 relative to the road center axis 151.

WPT Controller

Figure 5A:
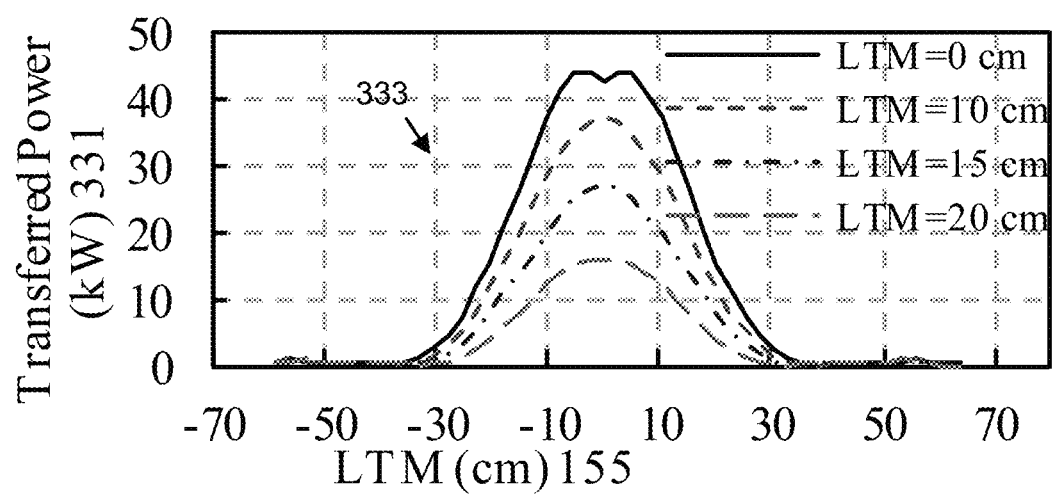
FIG. 5A is a graph illustrating embodiments of different misalignment scenarios.
Figure 5B:
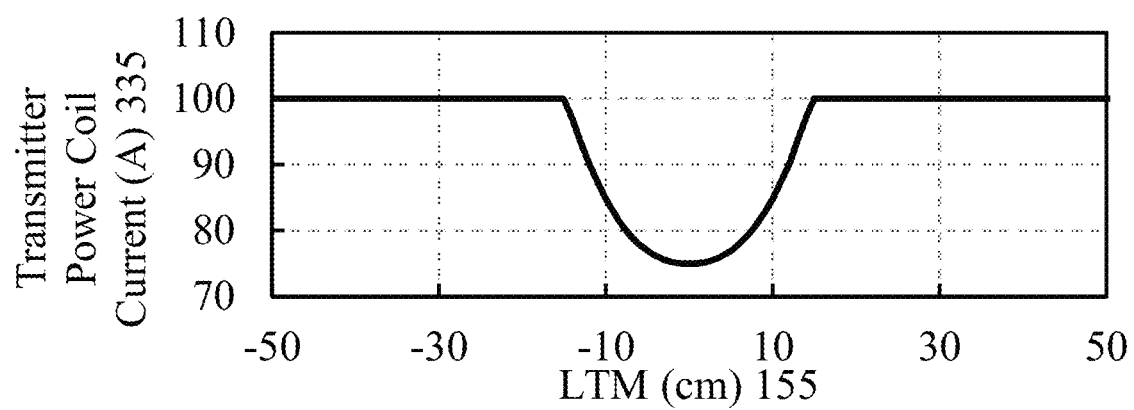
FIG. 5B is a graph illustrating one embodiment of a current reference.

The WPT controller 147 employs the detection information 173 provided by the DWPT System 100. The WPT control objective is to maintain a constant level of transferred energy regardless of varying LTM 155. To illustrate, the variation of power transfer with different misalignment scenarios, given in FIG. 5A can be helpful. For a reported LTM 155, and assuming constant vehicle speed 201, the transferred energy 332 can be calculated by integrating the corresponding LTM curve 333. It is evident that with an increased amount of LTM 155, the power envelope becomes smaller, causing the transferred power 331 to decrease. In other words, for higher LTMs 155, the transferred power 331 must be increased accordingly to fulfill the control objective, which is, to match the maximum transferred energy 331 corresponding to the most aligned case (LTM=0). FIG. 5B illustrates the required increase in transmission power coil current needed to transfer the same amount of energy while having a random LTM 155.

The nominal value of transmission power coil current may be selected to be 75 Amps (A), such as the vehicle 141 can receive nominal power at the most aligned case. The highest transmission power coil current value of 100 A for the transmitter power coil 117 is set by the hardware limitations. FIG. 5B shows the transmitter power coil current 335 generated by the WPT controller 147 at various LTM 155.

Figure 5C:
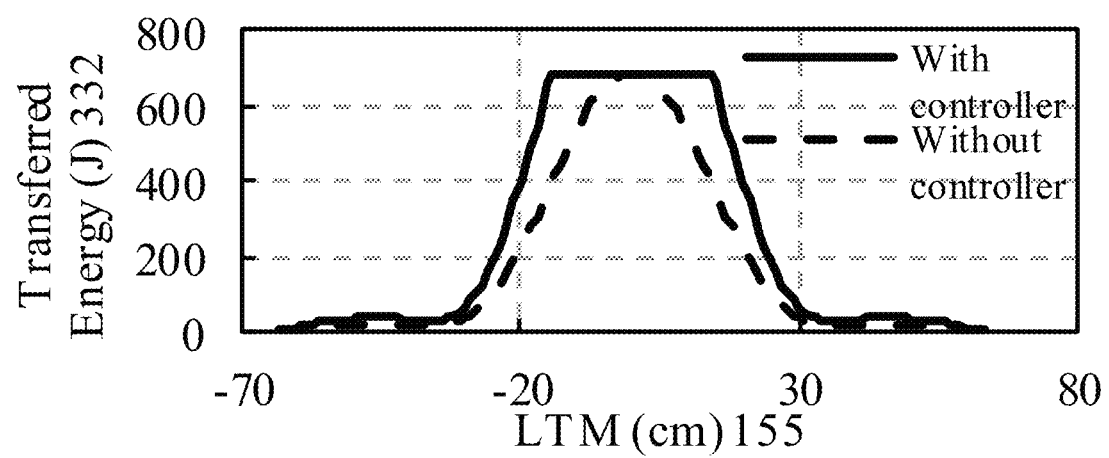
FIG. 5C is a graph illustrating one embodiment of improved transferred energy.

FIG. 5C depicts the improvement of transferred energy 332 with the WPT controller 147. It is evident that, when the vehicle 141 is perfectly aligned, the transferred energy 332 with the WPT controller 147 is equal to the transferred energy 332 while there is no WPT controller 147.

However, in practical scenarios, LTM 155 is unavoidable while driving. Studies have found that the standard deviation (SD) value of resulted misalignment while driving is 46 cm, which drops down to 26 cm while the drivers are aware of testing. It is evident from FIG. 5C that the WPT controller 147 significantly improves the transferred energy 332 at higher misalignment scenarios, thereby adapting the real road scenarios intelligently. By providing accurate misalignment information, misalignment detection thereby contributes to the efficient operation of the DWPT system 100.

Figure 5D:
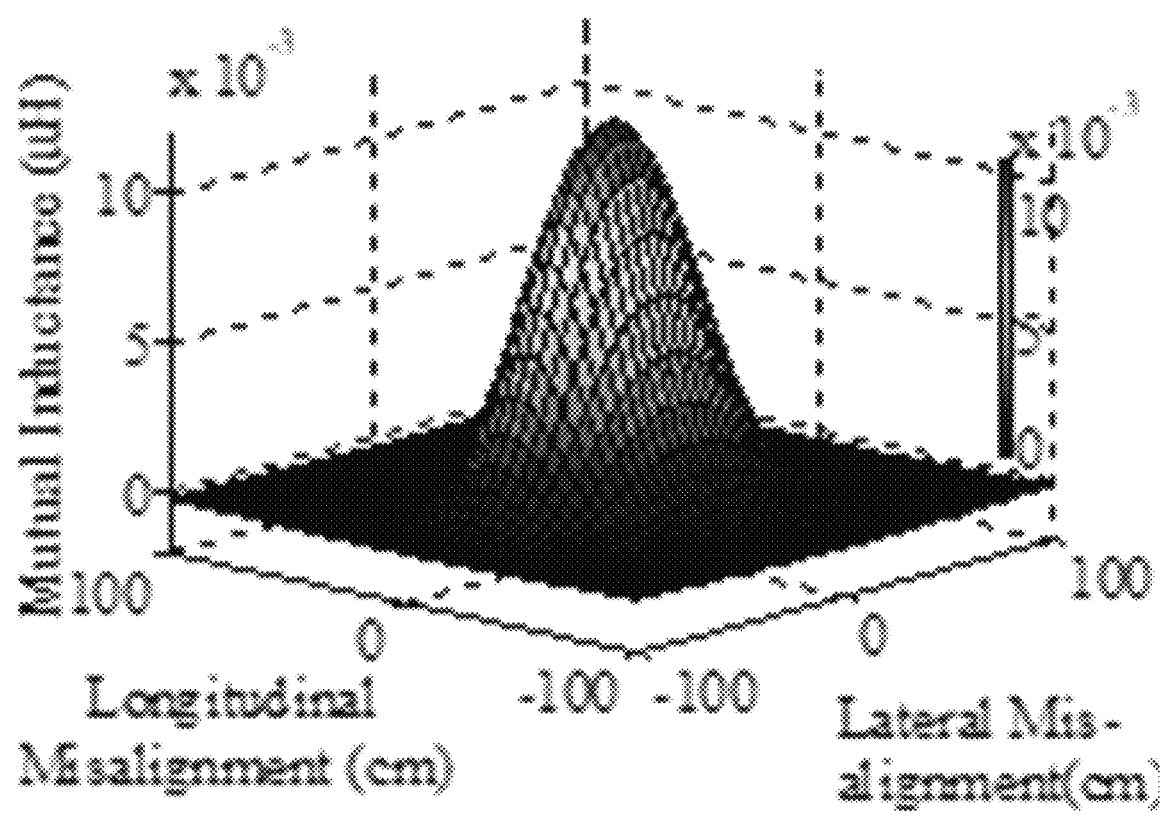
FIG. 5D is a graph illustrating one embodiment of a mutual induction profile for a single-coil design.

FIG. 5D shows a mutual induction profile for the single detection coil design 337 of FIG. 3. A common approach to calculate the mutual inductance between two current carrying filaments is by means of Neumann's formula shown in Equation 4.

$$M = \frac{\mu_0}{4\pi} \int \int \frac{ds \cdot ds'}{r} \qquad \text{Equation 4}$$

Here, r is the distance between the line elements ds and ds', and $\mu_0$ is the permeability of space. This basic formula could be extended to calculate the mutual inductance between two rectangular coils, such as those shown in FIG. 3. The depicted embodiment simulates the coupling profile between the vehicle detection coil 115 and the road detection coil 135.

The measured detection voltage is directly proportional to the mutual inductance for a constant transmitter power coil current 335. Consequently, the mutual inductance profile could be used to develop a misalignment detection algorithm. Depending on the value of mutual inductance, the misalignment could be readily detected. However, if only the individual value of the mutual inductance is used, it might often result in an erroneous misalignment value. The mutual inductance value is sensitive to vertical offset between the energized detection coils 115/135 and the receiving detection coils 115/135. Therefore, if the vehicle ground clearance is varied due to different weight-load conditions, it would change the mutual inductance values that would lead to a wrong result.

Figure 5E:
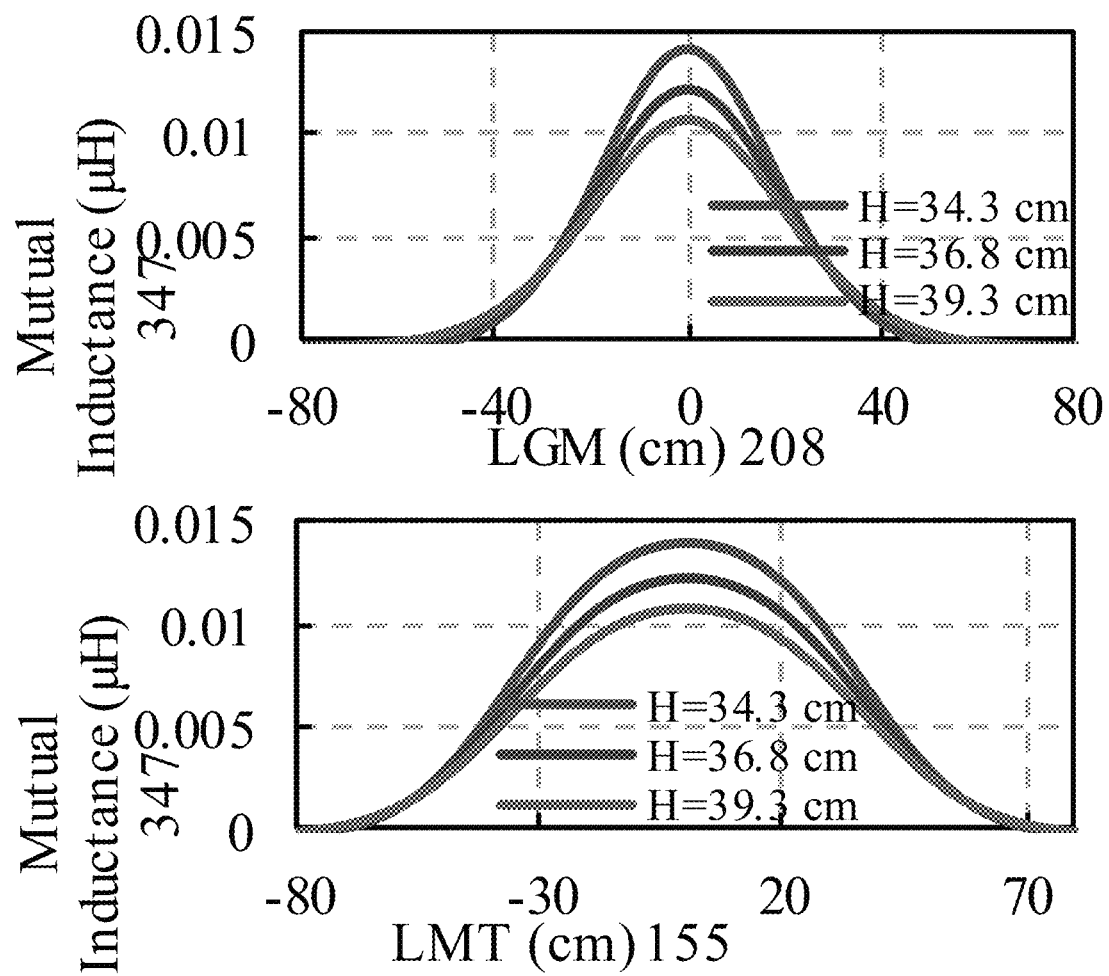
FIG. 5E is a graph illustrating one embodiment of a mutual inductance profile between a transmitter detection coil and a receiver detection coil for three different vehicle-to-ground clearances.

FIG. 5E shows the mutual inductance profile of mutual inductance 347 and LGM 208 and LMT 155 between the longitudinally aligned transmitter power coil 117 and receiver power coil 135 for three different vertical clearances H. The three different levels consist of an average vehicle ground clearance and two other clearances at +/−2.5 cm from that level (which represents overloaded and underloaded vehicle conditions).

Figure 5F:
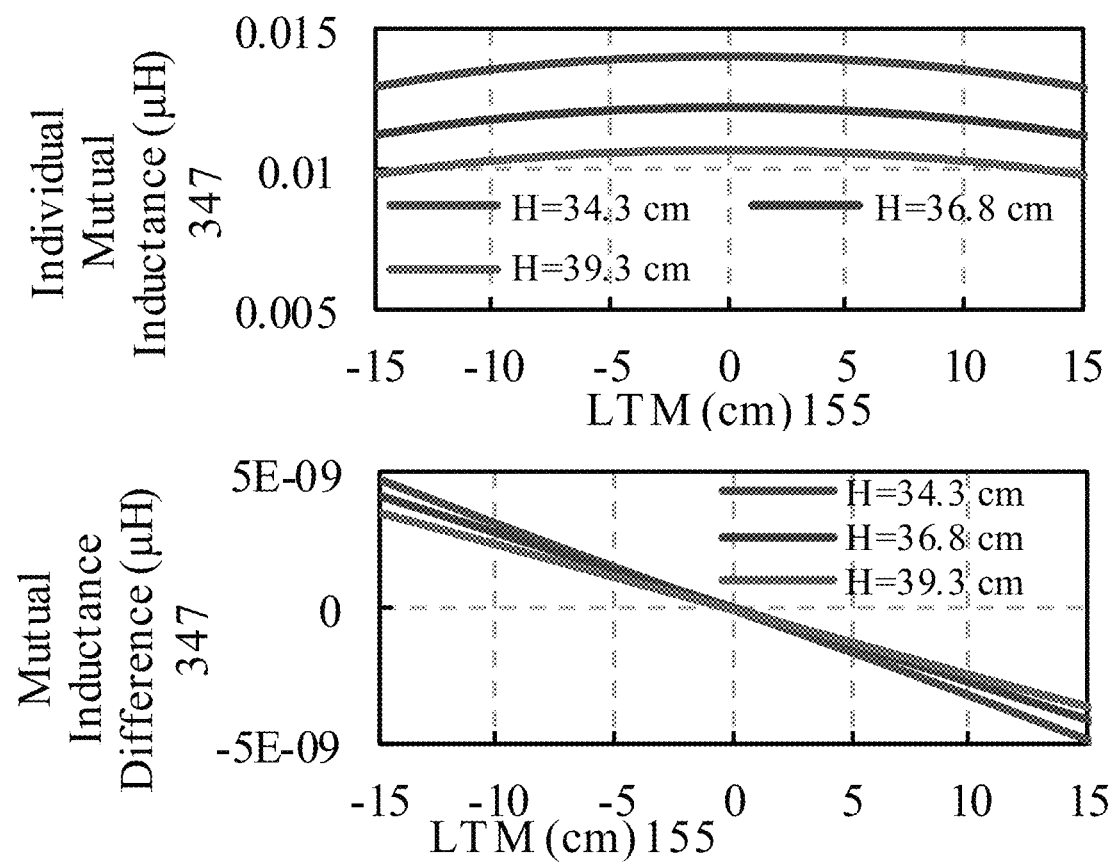
FIG. 5F is a graph illustrating one embodiment of the advantage of using measurement of mutual inductance difference for a double-coil design over the measurement of mutual inductance of a single-coil design in terms of eliminating the impact of vertical clearance variation.

FIG. 5F shows the improvement in mutual inductance 347 of vehicle detection coil 115 and the road detection coils 135 using the double-coil design 339 of FIG. 3A for three different vertical clearances H, by showing that the differential quantity has less variation than the individual quantity. The double-coil design 339 could use the mutual inductance difference between two road detection coils 135 to reduce the effect of height variations and other environmental variations. It could also result in a larger misalignment detection range.

Figure 5G:
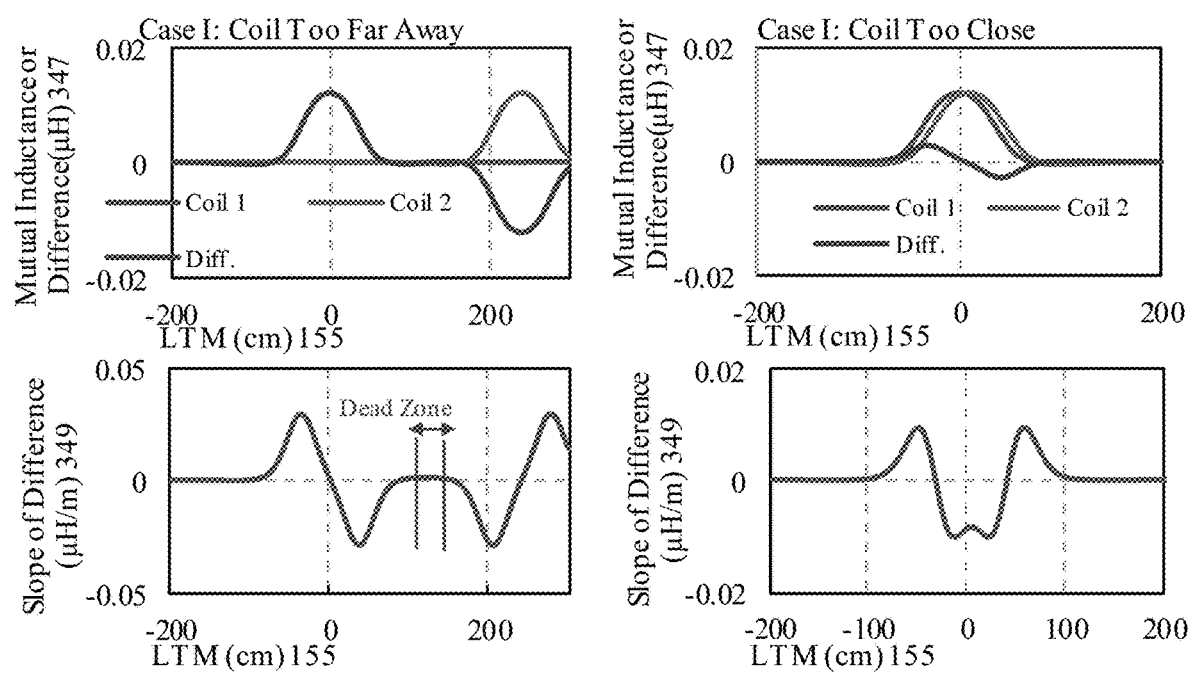
FIG. 5G is a graph illustrating one embodiment of mutual inductance and slopes of mutual inductance.
Figure 5H:
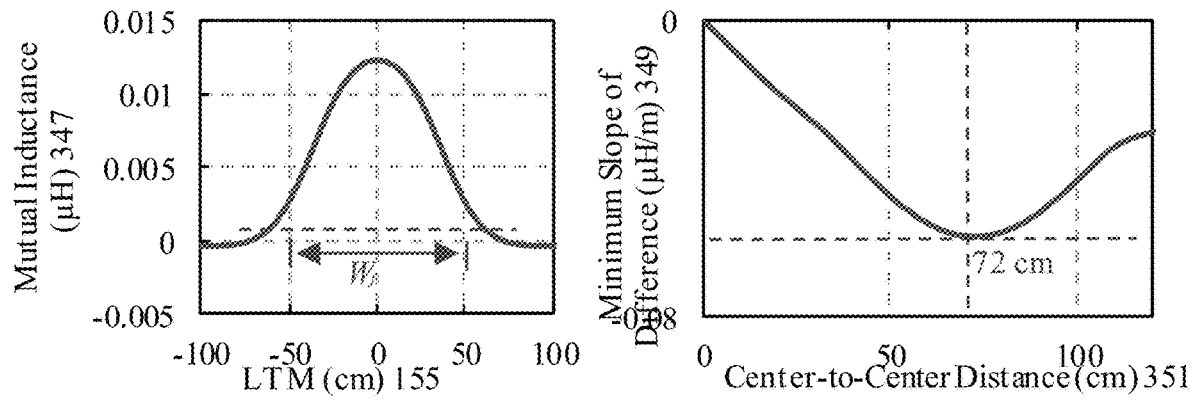
FIG. 5H is a graph illustrating one embodiment of determining a center-to-center distance.

FIG. 5G shows using mutual inductance 347 and slopes of mutual inductance differences 249 as change in inductance per meter to determine the distance between the two detection coils 115/135. Two extreme cases where the detection coils 115/135 are too close or too far away are illustrated. If the detection coils 115/135 are too close, the system 100 would effectively behave as a single-coil system, and the detection range would be small consequently. If the detection coils 115/135 are too far, there would be a "dead zone" with an unchanged difference value which cannot be interpreted by the detection algorithm, as there is no change in value with respect to misalignment in the "dead zone." The distance between the two detection coils 115/135 may be selected between these extreme cases FIG. 5H shows one embodiment of determining a center-to-center distance 351 between two detection coils 115/135. Low induced voltage values (corresponding to less than 10% of the maximum mutual inductance) could be corrupted by noise and might be hard to detect due to the voltage drop of the rectification diodes, thereby being prone to error. Therefore, a new variable named Field Width $W_f$ may be used to determine the center-to-center distance 351. $W_f$ represents the detectable region of the mutual inductance curve. By varying the center-to-center distance 351 between the two detection coils 115/135, it was found that if the center-to-center distance 351 is less than $W_f$, then there would be no "dead zone". This rule is used as the highest limit of the center-to-center coils distance 351. In addition, if the detection coils 115/135 are directly placed next to each other, the center-to-center distance 351 is equal to the detection coil width 181, which sets the lower limit of the allowable distance. The optimum value should be searched in between these maximum and minimum allowable distance values.

For finding the optimum value and detectable range, the following criteria may be used: i) In the optimum detectable range, the mutual inductance difference value should be unambiguous. That means that there should not be any identical values of the difference for two different misalignments. This condition narrows down the maximum possible detection zone in between the centers of the detection coils 115/135. In addition, as in the Wf explanation, less than 10% of the maximum value cannot be accurately detected. This further narrows the optimum detectable range. ii) The mutual inductance difference swing should be maximized on both sides of the misalignment axis. This would ensure that a small change in misalignment would trigger a large change in the difference, resulting in the higher resolution of detection. This optimization could be achieved by varying the center-to-center distance 351 and finding the center-to-center distance 351 corresponding to the lowest possible minima value of the slope of the difference.

Figure 5I:
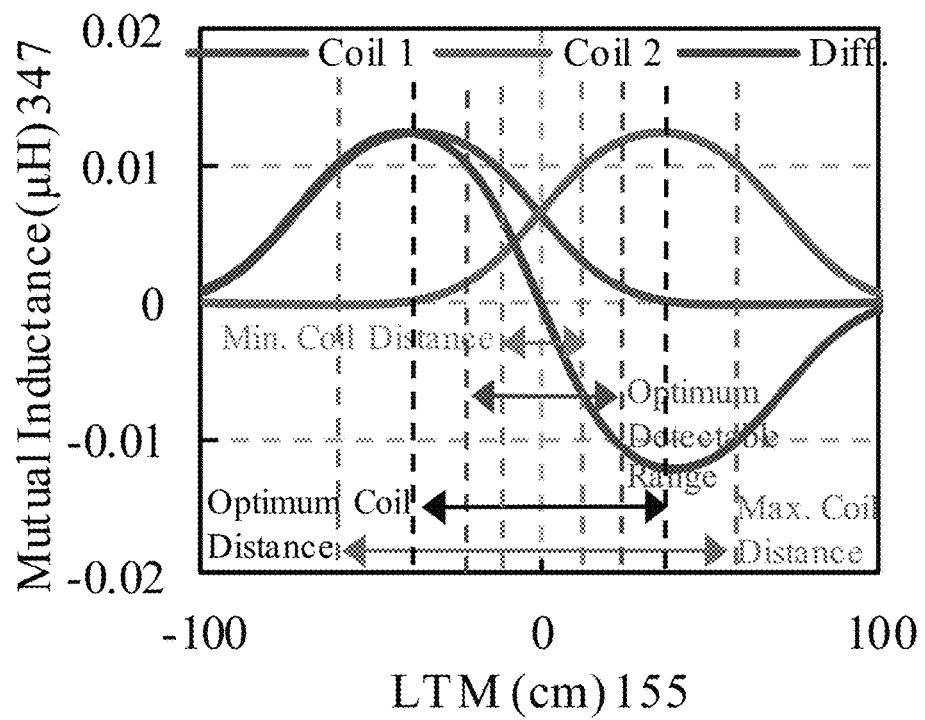
FIG. 5I is a graph illustrating one embodiment of center-to-center distances.

With this criterion, the optimized value of the center-to-center distance 351 was found to be 72 cm. FIG. 5I shows the relative position of the optimum, minimum, and maximum center-to-center distances along with the optimum detectable range which was found to be from −21 cm to +21 cm. With respect to the size of the road detection coil 135 of 27.6 cm, the optimum center-to-center distance 351 represents about 260% of this width, and the optimum detection range is then approximately 170% of the road detection coil width. These two parameters are scalable with the width of the road detection coils 135, which could be one approach to increase the detection range. Alternatively, an additional detection coil 115/135 can be used.

Figure 5J:
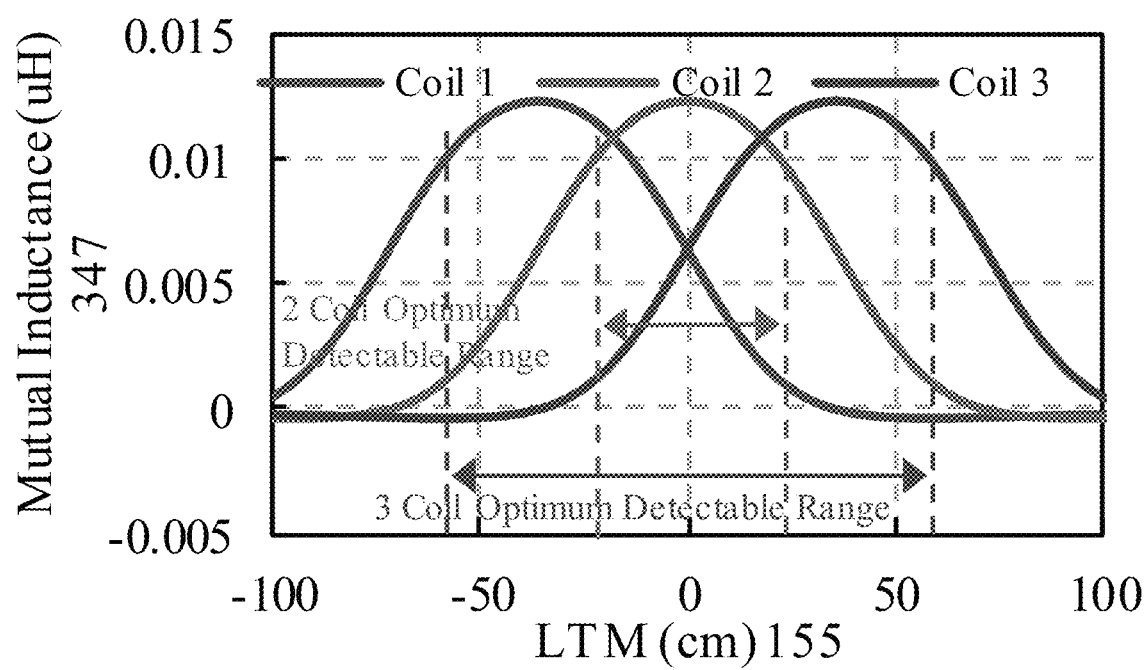
FIG. 5J is a graph illustrating one embodiment of lateral mutual inductance for three-coil designs.

FIG. 5J illustrates the lateral mutual inductance profile for the Inline three-coil design 341 and the triangular three-coil design 343 of FIG. 3A. The three-coil designs 341/343 may cover a wider area than the double coil design 339, resulting in a wider and more accurate LTM detection range. If the center coil is displaced along the longitudinal axis, it will result in an additional speed detection capability of the design.

FIG. 5J demonstrates the mutual inductance profile of the triangular three-coil design 343. It demonstrates that with a third detection coil 115/135 inserted in the middle of the double-coil design 339, it is possible to increase the optimum detectable range in both directions from ±21 cm to ±58 cm. While the LTM 155 is within ±21 cm, the misalignment can still be determined from Coil 1 and Coil 3. However, when either Coil 1 or Coil 3 drops below 10% of the maximum in the positive or negative direction, Coil 2 can be used to measure misalignment. Thereby, in both directions, the 10% cutoff line of Coil 2 determines the boundary of optimum detection range. That makes the optimum detectable range of the three-coil system equal to $W_f$ of the central coil. Outside the $W_f$ range, the measured position detection signals 119 may still be used for misalignment estimation, but the position detection signals 119 would be prone to variable vertical offset error.

Figure 6A:
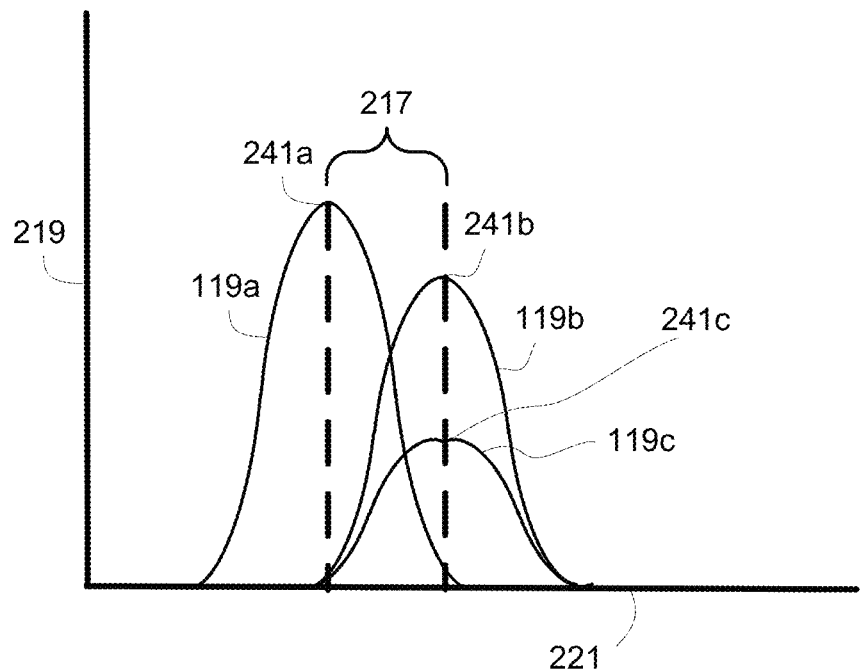
FIG. 6A is a graph illustrating one embodiment of position detection signals.

FIG. 6A is a graph illustrating one embodiment of position detection signals 119. In the depicted embodiment, signal voltage 219 is shown as a function of time 221. A plurality of position detection signals 119a-c are shown. Each position detection signal 119 has an envelope peak 241. A signal distance 217 may be a time interval between envelope peaks 241 of two position detection signals 119.

To avoid interference between the two systems (including the impact of harmonics), the operation frequency of the detection coils 115/135 may be positioned far from the WPT frequency. The frequency sweep characteristics of the detection coil 115/135 reveals that the coil's ESR (Equivalent Series Resistance) increases with frequency, causing the coil quality factor to drop eventually. To ensure an acceptable efficiency while being reasonably far from the DWPT frequency (20 kHz), the detection operating frequency was chosen to be 95 kHz (at the position of "95/20=4.75th" harmonic), where it cannot significantly interfere with the DWPT.

Figure 6B:
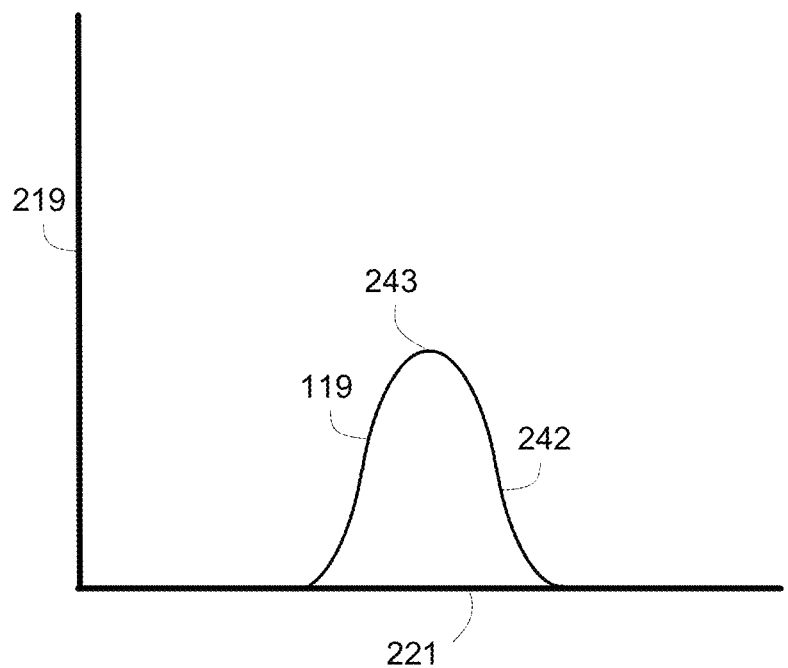
FIG. 6B is a graph illustrating one embodiment of an envelope peak.

FIG. 6B is a graph illustrating one embodiment of an envelope peak 241. The position detection signal 119 is shown, wherein the position detection signal 119 over time 221 is the signal envelope 242. In the depicted embodiment, the envelope peak 241 for a position detection signal 119 is at the maximum signal voltage 219.

Figure 6C:
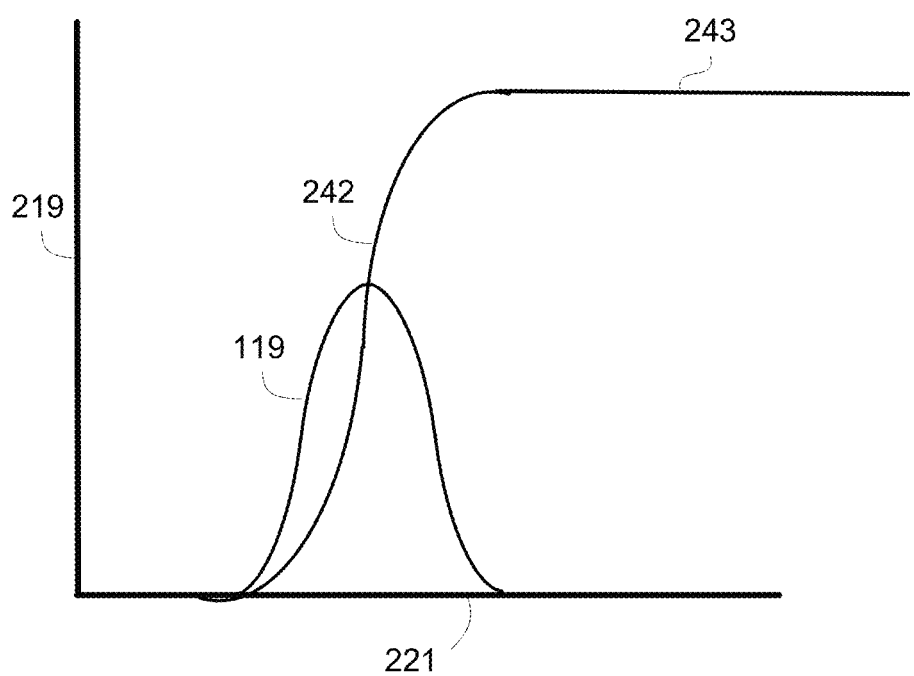
FIG. 6C is a graph illustrating one alternate embodiment of an envelope peak.

FIG. 6C is a graph illustrating one alternate embodiment of an integral peak 243. In the depicted embodiment, an signal envelope 242 that is an integral of a position detection signal 119 is shown. An envelope peak 243 is shown as a maximum value of the signal envelope 242.

Figure 6D:
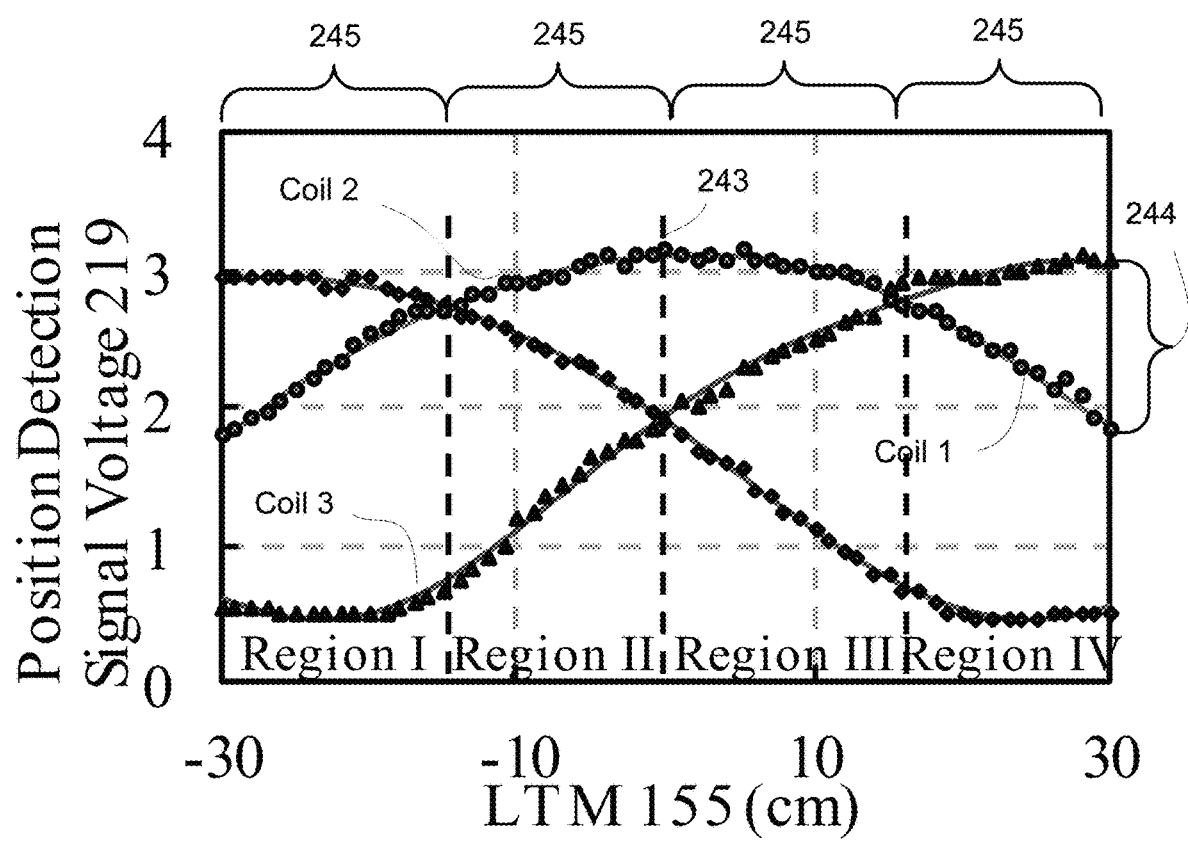
FIG. 6D is a graph illustrating position detection signals for three detection coils.

FIG. 6D is a graph illustrating position detection signal 119 for three detection coils 115/135. The position detection signals 119 of each detection coil 115/135 has a bell-shaped voltage profile with an envelope peak 243 corresponding to the perfect alignment between that detection coil 115/135 and the energized field-generating detection coil 115/135. In the graph, position detection signals 119 of the detection coils 115/135 are referred to as Coil 1, Coil 2, and Coil 3. Since Coil 2 is perfectly aligned with the energized field-generating detection coil 115/135 at zero LTM 155, Coil 2 has an envelope peak 241 at that point. In order to determine LTM 155, the voltage profile is divided into four profile regions 245, as shown. These profile regions 245 are determined by observing where the position detection signal voltages 219 cross each other, with the profile region boundary at each crossing. It could be determined which section the system 100 is operating in by simply subtracting the position detection signal voltages 219 from each other. This allows for faster computation and higher accuracy. Once a region is determined, the position detection signal voltages 219 are used to determine an exact LTM 155 from an envelope voltage difference 244. To get high accuracy, the position detection signal 119 with the highest and steady slope may be used in each region. In Region I, the voltage difference between Coil 2 and Coil 1 is used. Regions II and III use the difference between Coil 1 and 3. In Region IV, the voltage difference between Coil 2 and 3 is used. All characterization results are incorporated into the detection algorithm. The detection system hardware specifications are summarized in Table 1.

TABLE 1

| Parameter | Value |
| --- | --- |
| Supply voltage | 12 V |
| Operation frequency | 95 kHz |
| Energized field-generating detection coil track current | 1 A (RMS) |
| Energized field-generating detection coil Litz wire specification | 5/5/28/40 |
| Energized field-generating detection coil number of turns | 20 |
| Energized field-generating detection coil Mean Length Turn (MLT) | 1.70 m |
| Energized field-generating detection coil outer dimensions | 75 cm × 20 m |
| Detection coil Litz wire specification | 20/44 |
| Detection coil MLT | 0.914 m |
| Detection coil outer dimensions | 26.7 cm × 21.6 cm |
| Detection coil number of turns | 45 |

Figure 7:
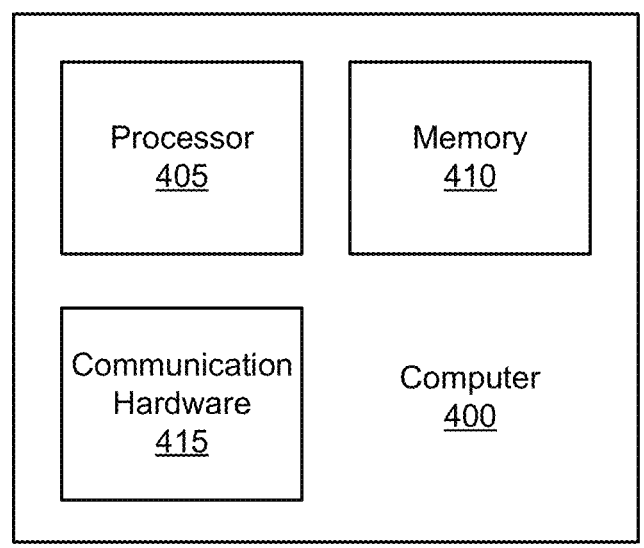
FIG. 7 is a schematic block diagram illustrating one embodiment of a computer.

FIG. 7 is a schematic block diagram illustrating one embodiment of a computer 400. The computer 400 may be embedded in, the detection system microcontroller 361, the WPT controller 147, the roadside controller 149, and the like. In the depicted embodiment, the computer 400 includes a processor 405, a memory 410, and communication hardware 415. The memory 410 may include a semiconductor storage device, microcontroller memory, hard disk drive, an optical storage device, or combinations thereof. The memory 410 may store code. The processor 405 may execute the code. The communication hardware 415 may communicate with other devices.

Figure 8A:
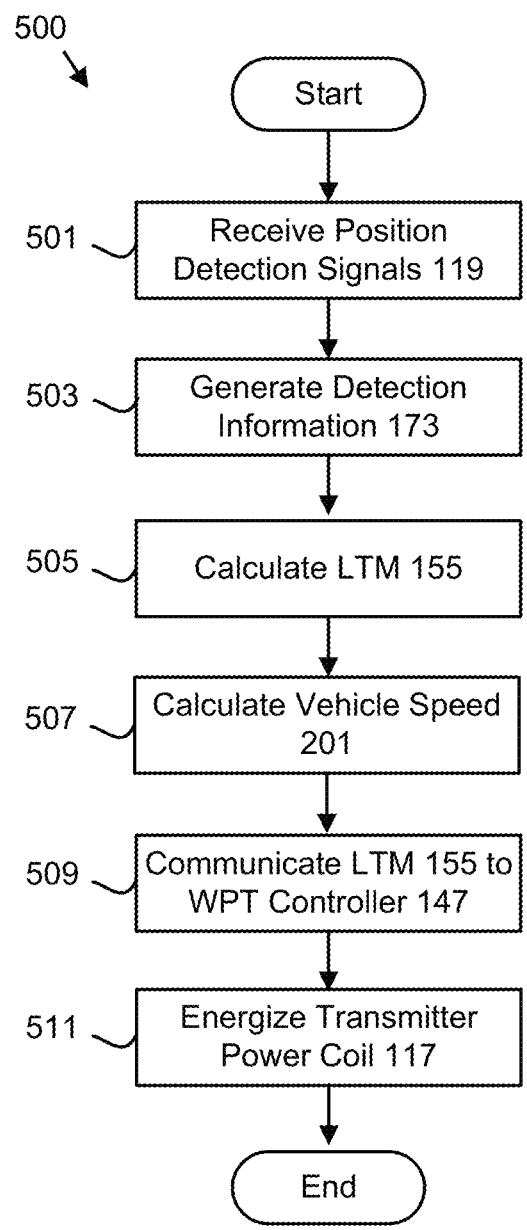
FIG. 8A is a schematic flow chart diagram illustrating one embodiment of a misalignment measurement and speed measurement methods.

FIG. 8A is a schematic flow chart diagram illustrating one embodiment of a misalignment measurement method 500. The method 500 may calculate the vehicle speed 201 and the LTM 155 and energize the transmitter power coil 117 based on the vehicle speed 201 and/or LTM 155. The method 500 may be performed by a processor 405.

The method 500 starts, and in one embodiment, the processor 405 receives 501 a plurality of position detection signals 119 from a corresponding plurality of detection coils 115/135. The plurality of position detection signals 119 are generated from mutual inductance 347 between the plurality of detection coils 115/135 and an energized field-generating detection coil 115/135.

The plurality of detection coils 115/135 may be road detection coils 135 disposed in the road 305 and the energized field-generating detection coil 115/135 may a vehicle detection coil 115 mounted in the vehicle 141. Alternatively, the plurality of detection coils 115/135 are road detection coils 135 disposed in a road and the energized field-generating detection coil 115/135 is a vehicle detection coil 115 mounted in a vehicle 141.

The processor 405 may generate 503 detection information 173 from the position detection signals 119. The generation 503 of the detection information 173 is described in more detail in FIG. 8B.

The processor 405 may further calculate 505 the LTM 155. The LTM 155 may be calculated 505 along the lateral Y axis 189 from the detection information 173. The calculation 505 of the LTM 155 is described in more detail in FIG. 8B.

In one embodiment, the processor 405 calculates 507 the vehicle speed 201 along the longitudinal X axis 187 from the detection information 173. The vehicle speed 201 may be calculated 507 as the longitudinal distance 185 divided by the signal difference 217.

The processor 405 may communicate 509 the LTM 155 to the WPT controller 147 and/or roadside controller 149. In a certain embodiment, the processor 405 communicates 509 the LTM 155 to the DIS 175.

The processor 405 may energize 511 the transmitter power coil 117 based on the vehicle speed 201 and LTM 155 and the method 500 ends. The processor 405 may further control the power transfer based on the vehicle speed 201 and the LTM 155. The processor 405 may energize 511 the transmitter power coil 117 via the WPT controller 147 by directing the WPT controller 147 to energize 511 the transmitter power coil 117. In one embodiment, the transmitter power coil 117 is energized with increased current based on the LTM 155 as described hereafter in FIG. 8C.

Figure 8B:
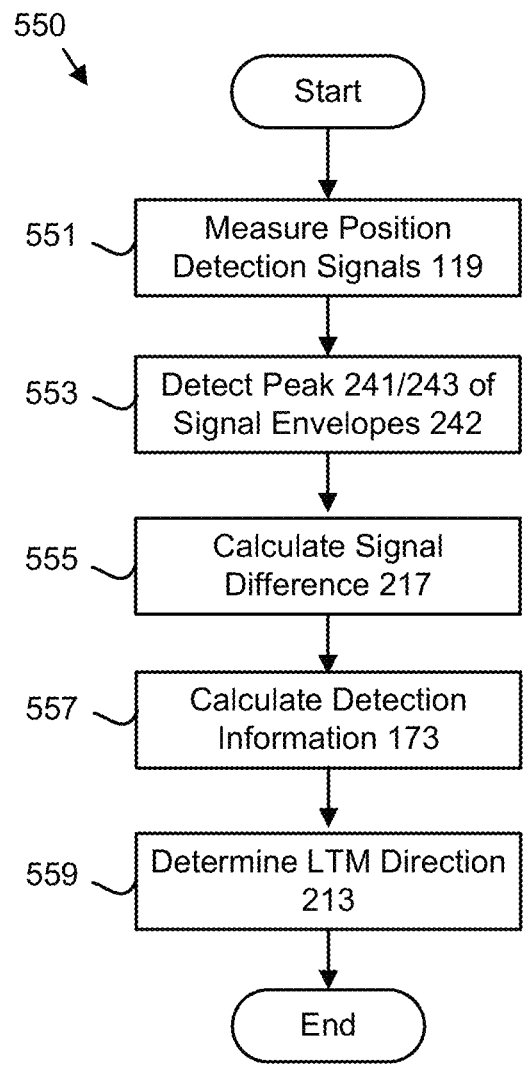
FIG. 8B is a schematic flow chart diagram illustrating one embodiment of a misalignment-direction determination method.

FIG. 8B is a schematic flow chart diagram illustrating one embodiment of a misalignment determination method 550. The method 550 may calculate the detection information 173 and the LTM 155. In one embodiment, the method 550 performs steps 503 and 505 of FIG. 8A. The method 550 may be performed by the processor 405.

The method 550 starts, and in one embodiment, the processor 405 measures 551 the position detection signals 119. The processor 405 may measure 551 the voltage of the position detection signals 119 for a plurality of temporal instances. The processor 405 further detects 553 the envelope peak 241 of each signal envelope 242 for the position detection signals 119. In addition, the processor 405 may detect 553 the integral peak 243 for the position detection signals 119.

The processor 405 may calculate 555 the signal difference 217 between the position detection signals 119. The signal difference 217 may be calculated 555 between the envelope peaks 241. In addition, the signal difference 217 may be calculated 555 between the integral peaks 243.

The processor 405 may further calculate 557 the detection information 173. The detection information 173 may be a function of the signal differences 217 and/or envelope differences 244. In one embodiment, the processor 405 may determine the four profile regions 245. The processor 405 may select the two signal envelopes 242 with the highest voltage and steadiest slopes near a position detection signal voltage 219 crossing. The crossing of the signal envelopes 242 for the two selected signal envelope 242 may be identified as a profile region boundary. The system detection information 173 may be calculated by calculating the envelope voltage difference 244 for the signal envelopes 242 for the selected signal envelopes 242 within each profile region 245.

The processor 405 may determine 559 the LTM distance 211 and the LTM direction 213 from the detection information 173 and the method 550 ends.

Figure 8C:
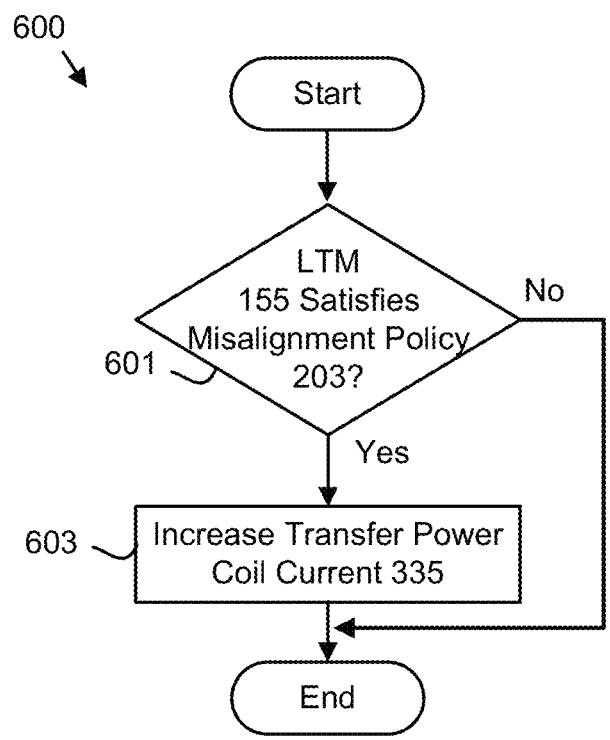
FIG. 8C is a schematic flow chart diagram illustrating one embodiment of a transmitter power coil energization method.

FIG. 8C is a schematic flow chart diagram illustrating one embodiment of a transmitter power coil energization method 600. The method 600 may energize the transmitter power coil 117. The method 600 may perform step 511 of FIG. 8A. the method 600 may be performed by the processor 405.

The method 600 starts, and in one embodiment, the processor 405 determines 601 if the LTM 155 satisfies the misalignment policy 203.

If the LTM 155 satisfies the misalignment policy 203, the processor 405 may increase 603 the transmitter power coil current 335 to the transmitter power coil 117 and the method 600 ends. If the misalignment policy 203 is not satisfied, the method 600 ends.

In one test of the embodiments, the LTM 155 was tested for ±30 cm from the road center axis 151. This test was done for different ground clearances (emulated by detection coils lifting or lowering instead of loading the bus), and the results are summarized in Table 2. The measured results an average absolute error of 0.0645 cm for nominal clearance. When the mechanical load changes, the clearance also changes. For a ±2.5-cm variation of clearance, the reported misalignment error was roughly restricted within 1 cm.

TABLE 2

| Experimented range (cm) | Misalignment step size (cm) | Ground clearance (cm) | Mean absolute error (cm) | Reported maximum error (cm) |
|---|---|---|---|---|
| −30 to +30 | 2 | 34.3 | 1.0323 | 2 |
| −30 to +30 | 2 | 36.83 | 0.0645 | 1 |
| −30 to +30 | 2 | 39.37 | 0.6452 | 2 |

The embodiments detect the LTM 155 for the vehicle 141 and mitigate the misalignment, improving the efficiency of charging the battery 101 of the vehicle 141. Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A method comprising:
receiving, by use of a processor, a plurality of position detection signals from a corresponding plurality of detection coils, wherein the plurality of position detection signals are generated from mutual inductance between the plurality of detection coils and an energized field-generating detection coil;
generating detection information from the position detection signals by detecting an envelope peak of each signal envelope as the position detection signals, calculating a signal difference as a time interval between each envelope peak, selecting two signal envelopes with highest voltages and steadiest slopes near the a position detection signal voltage crossing, and calcu- lating the detection information as an envelope voltage difference for the selected signal envelopes;

calculating a lateral misalignment (LTM) along a lateral Y axis from the detection information, wherein the LTM comprises an LTM distance and an LTM direction;

calculating a vehicle speed along a longitudinal X axis from the detection information; and energizing a transmitter power coil and controlling the power transfer based on the vehicle speed and the LTM.

2. The method of claim 1, wherein generating the detection information and calculating the LTM further comprises: measuring the position detection.

3. The method of claim 1, wherein the plurality of detection coils are road detection coils disposed in a road and the energized field-generating detection coil is a vehicle detection coil mounted in the vehicle.

4. The method of claim 1, wherein the plurality of detection coils are vehicle detection coils mounted on a vehicle and the energized field-generating detection coil is a road field-generating detection coil disposed in a road.

5. The method of claim 1, the method further communicating the LTM to a Wireless Power Transfer (WPT) controller.

6. The method of claim 1, wherein the transmitter power coil is energized with increased current based on the LTM.

7. The method of claim 1, wherein the plurality of detection coils comprise a three-coil design.

8. The method of claim 7, wherein the three-coil design is one of an inline three-coil design and a triangular three-coil design.

9. The method of claim 1, wherein plurality of detection coils comprise a double-coil design.

10. An apparatus comprising:

a plurality of detection coils that each generate a corresponding plurality of position detection signals, wherein the plurality of position detection signals are generated from mutual inductance between the plurality of detection coils and an energized field-generating detection coil;

a transmitter power coil disposed in a road that generates a charging inductance;

a processor that executes code to perform:

receiving a plurality of position detection signals from a corresponding plurality of detection coils;

generating detection information from the position detection signals by detecting an envelope peak of each signal envelope as the position detection signals, calculating a signal difference as a time interval between each envelope peak, selecting two signal envelopes with highest voltages and steadiest slopes near the a position detection signal voltage crossing, and calculating the detection information as an envelope voltage difference for the selected signal envelopes;

calculating a lateral misalignment (LTM) along a lateral Y axis from the detection information, wherein the LTM comprises an LTM distance and an LTM direction;

calculating a vehicle speed along a longitudinal X axis from the detection information; and energizing the transmitter power coil and controlling the power transfer based on the vehicle speed and the LTM.

11. The apparatus of claim 10, wherein generating the detection information and calculating the LTM further comprises:

measuring the position detection.

12. The apparatus of claim 10, wherein the plurality of detection coils are road detection coils disposed in a road and the energized field-generating detection coil is a vehicle detection coil mounted in the vehicle.

13. The apparatus of claim 10, wherein the plurality of detection coils are vehicle detection coils mounted on a vehicle and the energized field-generating detection coil is a road field-generating detection coil disposed in the road.

14. The apparatus of claim 10, the processor further communicating the LTM to a Wireless Power Transfer (WPT) controller.

15. The apparatus of claim 10, wherein the transmitter power coil is energized with increased current based on the LTM.

16. The apparatus of claim 10, wherein the plurality of detection coils comprise a three-coil design.

17. The apparatus of claim 16, wherein the three-coil design is one of an inline three-coil design and a triangular three-coil design.

18. An apparatus comprising:

a plurality of detection coils that each generate a corresponding plurality of position detection signals, wherein the plurality of position detection signals are generated from mutual inductance between the plurality of detection coils and an energized field-generating detection coil;

a transmitter power coil disposed in a road that generates a charging inductance;

a Wireless Power Transfer (WPT) controller that energizes the transmitter power coil;

a processor that executes code to perform:

receiving a plurality of position detection signals from a corresponding plurality of detection coils;

generating detection information from the position detection signals by detecting an envelope peak of each signal envelope as the position detection signals, calculating a signal difference as a time interval between each envelope peak, selecting two signal envelopes with highest voltages and steadiest slopes near the a position detection signal voltage crossing, and calculating the detection information as an envelope voltage difference for the selected signal envelopes;

calculating a lateral misalignment (LTM) along a lateral Y axis from the detection information, wherein the LTM comprises an LTM distance and an LTM direction;

calculating a vehicle speed along a longitudinal X axis from the detection information; and energizing the transmitter power coil and controlling the power transfer via the WPT controller based on the vehicle speed and the LTM.

* * * * *